(12) United States Patent
Wang

(10) Patent No.: US 10,647,099 B2
(45) Date of Patent: May 12, 2020

(54) METHODS AND APPARATUS TO FORM VENTING CHANNELS ON A PANEL FOR A DECORATIVE LAYER

(71) Applicant: The Boeing Company, Chicago, IL (US)

(72) Inventor: Xiaoxi Wang, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 15/153,324

(22) Filed: May 12, 2016

(65) Prior Publication Data

US 2017/0326858 A1 Nov. 16, 2017

(51) Int. Cl.
*B32B 37/00* (2006.01)
*B44C 1/00* (2006.01)
(Continued)

(52) U.S. Cl.
CPC ............ *B32B 37/003* (2013.01); *B29B 15/00* (2013.01); *B29C 37/0064* (2013.01); *B29C 63/0047* (2013.01); *B29C 63/02* (2013.01); *B32B 37/0053* (2013.01); *B32B 38/0012* (2013.01); *B44C 1/105* (2013.01); *B29C 59/04* (2013.01); *B29C 63/481* (2013.01);
(Continued)

(58) Field of Classification Search
None
See application file for complete search history.

(56) References Cited

U.S. PATENT DOCUMENTS

| 2,268,477 | A |   | 12/1941 | Elmendort |
| 2,664,833 | A | * | 1/1954  | Armstrong ............... A21C 9/08 |
|           |   |   |         | 33/9 R |

(Continued)

FOREIGN PATENT DOCUMENTS

| CH | 498714    | 11/1970 |
| CN | 202115040 | 1/2012  |

(Continued)

OTHER PUBLICATIONS

3M, "200MP Micro-channel Laminating Adhesives. 467MC, 468MC, 467MCF and 468MCF", accessed at [http://kleylenta.ru/download/lenta/467mc.pdf]on Jun. 1, 2016, (3 pages).

(Continued)

*Primary Examiner* — Linda L Gray
(74) *Attorney, Agent, or Firm* — Hanley, Flight & Zimmerman, LLC

(57) ABSTRACT

Methods and apparatus to form venting channels on a panel for a decorative layer are disclosed. An example method includes contacting an outer surface of a tool to an outer resin layer of a panel. The outer surface of the tool has protrusions. The example method includes moving the outer surface of the tool on the outer resin layer of the panel in a first direction to cause the protrusions of the tool to form first venting channels on the outer resin layer of the panel and coupling a decorative layer to the outer resin layer of the panel via an adhesive layer. The first venting channels are to vent at least one of gas or vapor away from the decorative layer to deter separation of a portion of the decorative layer from the outer resin layer.

20 Claims, 8 Drawing Sheets

(51) Int. Cl.
| | | |
|---|---|---|
| *B32B 38/00* | (2006.01) | |
| *B29C 37/00* | (2006.01) | |
| *B29C 63/00* | (2006.01) | |
| *B29B 15/00* | (2006.01) | |
| *B29C 59/00* | (2006.01) | |
| *B29D 24/00* | (2006.01) | |
| *B32B 43/00* | (2006.01) | |
| *B32B 3/00* | (2006.01) | |
| *B44C 1/10* | (2006.01) | |
| *B29C 63/02* | (2006.01) | |
| *B32B 38/06* | (2006.01) | |
| *B29C 59/04* | (2006.01) | |
| *B32B 37/12* | (2006.01) | |
| *B29C 63/48* | (2006.01) | |
| *B32B 3/12* | (2006.01) | |

(52) U.S. Cl.
CPC .............. *B29D 24/002* (2013.01); *B32B 3/12* (2013.01); *B32B 37/12* (2013.01); *B32B 38/06* (2013.01); *B32B 43/006* (2013.01); *B32B 2305/022* (2013.01); *B32B 2305/024* (2013.01); *B32B 2305/076* (2013.01); *B32B 2305/08* (2013.01); *B32B 2451/00* (2013.01); *B32B 2605/00* (2013.01); *B32B 2605/18* (2013.01)

(56) References Cited

U.S. PATENT DOCUMENTS

| | | | |
|---|---|---|---|
| 3,418,189 A | 12/1968 | Grosheim | |
| 3,434,411 A | 3/1969 | Allen et al. | |
| 4,219,376 A | 8/1980 | Roman | |
| 4,238,437 A | 12/1980 | Rolston | |
| 4,350,545 A | 9/1982 | Garabedian | |
| 4,367,110 A | 1/1983 | Yoshikawa | |
| 4,489,119 A * | 12/1984 | Ishige .................... B32B 5/18 | |
| | | | 428/167 |
| 4,504,205 A | 3/1985 | Stofko | |
| 4,598,007 A | 7/1986 | Kourtides et al. | |
| 4,599,127 A | 7/1986 | Cannady, Jr. et al. | |
| 4,693,926 A | 9/1987 | Kowalski et al. | |
| 4,803,108 A | 2/1989 | Leuchten et al. | |
| 4,855,182 A | 8/1989 | Ondrejas et al. | |
| 5,037,350 A * | 8/1991 | Richardson ............... A22C 7/00 | |
| | | | 426/518 |
| 5,085,921 A | 2/1992 | Jayarajan | |
| 5,137,775 A | 8/1992 | Davis et al. | |
| 5,589,016 A | 12/1996 | Hoopingarner et al. | |
| 5,624,728 A | 4/1997 | Hoopingarner et al. | |
| 5,698,153 A | 12/1997 | Hoopingarner et al. | |
| 5,806,796 A | 9/1998 | Healey | |
| 5,976,671 A | 11/1999 | Gleim | |
| 6,066,385 A | 5/2000 | Kim | |
| 6,251,497 B1 | 6/2001 | Hoopingarner et al. | |
| 6,340,413 B1 | 1/2002 | Nilsson et al. | |
| 6,419,776 B1 | 7/2002 | Hoopingarner et al. | |
| 6,656,567 B1 | 12/2003 | Abe et al. | |
| 6,726,971 B1 | 4/2004 | Wong | |
| 7,063,119 B1 | 6/2006 | Kim | |
| 8,097,108 B2 | 1/2012 | Wilde et al. | |
| 8,555,946 B2 | 10/2013 | Luo et al. | |
| 8,715,824 B2 | 5/2014 | Rawlings et al. | |
| 9,855,721 B2 | 1/2018 | Drexler et al. | |
| 10,173,394 B2 | 1/2019 | Wang et al. | |
| 2002/0084975 A1 | 7/2002 | Lin | |
| 2002/0160680 A1 | 10/2002 | Laurence et al. | |
| 2002/0182957 A1 | 12/2002 | Levenda | |
| 2003/0033779 A1 | 2/2003 | Downey | |
| 2003/0077423 A1 | 4/2003 | Flanigan et al. | |
| 2003/0190458 A1 | 10/2003 | Spiewak et al. | |
| 2003/0219578 A1 | 11/2003 | Jones et al. | |
| 2004/0146696 A1 | 7/2004 | Jones | |
| 2004/0192137 A1 | 9/2004 | Starkey et al. | |
| 2004/0253414 A1 | 12/2004 | Longobardi | |
| 2005/0050782 A1 | 3/2005 | Ryan et al. | |
| 2005/0052516 A1 | 3/2005 | Wilde et al. | |
| 2005/0088014 A1 | 4/2005 | Woodson et al. | |
| 2005/0153023 A1 * | 7/2005 | Overton ............... A21C 11/106 | |
| | | | 426/94 |
| 2005/0255311 A1 | 11/2005 | Formella | |
| 2006/0089073 A1 | 4/2006 | Sobieski | |
| 2006/0151857 A1 | 7/2006 | Gasparoni | |
| 2006/0234010 A1 | 10/2006 | Wirrick et al. | |
| 2006/0246796 A1 | 11/2006 | Duffy | |
| 2006/0277807 A1 | 12/2006 | Wilde et al. | |
| 2007/0148410 A1 | 6/2007 | Wimer et al. | |
| 2007/0218269 A1 | 9/2007 | Kato et al. | |
| 2008/0087376 A1 | 4/2008 | Kitchin et al. | |
| 2008/0145600 A1 | 6/2008 | Hendren et al. | |
| 2008/0193695 A1 | 8/2008 | Kato et al. | |
| 2008/0237909 A1 | 10/2008 | Bech | |
| 2009/0057947 A1 | 3/2009 | Nemchick et al. | |
| 2010/0139839 A1 | 6/2010 | Ridgard et al. | |
| 2010/0215907 A1 | 8/2010 | Spires | |
| 2011/0014419 A1 | 1/2011 | Simmons et al. | |
| 2011/0042000 A1 | 2/2011 | Wilde et al. | |
| 2012/0045638 A1 | 2/2012 | Waldman et al. | |
| 2014/0120303 A1 | 5/2014 | Wilde et al. | |
| 2014/0209231 A1 | 7/2014 | Schappert | |
| 2016/0089851 A1 | 3/2016 | Drexler et al. | |
| 2016/0250828 A1 | 9/2016 | Wilde et al. | |
| 2017/0326836 A1 | 11/2017 | Wilde et al. | |
| 2017/0326837 A1 | 11/2017 | Wang et al. | |
| 2017/0326845 A1 | 11/2017 | Benham et al. | |
| 2017/0326859 A1 | 11/2017 | Wang et al. | |
| 2017/0326863 A1 | 11/2017 | Wang et al. | |

FOREIGN PATENT DOCUMENTS

| | | | |
|---|---|---|---|
| DE | 19640263 | 4/1998 | |
| DE | 102006054586 | 1/2008 | |
| EP | 1013414 | 6/2000 | |
| EP | 1600288 | 11/2005 | |
| EP | 2085212 | 8/2009 | |
| EP | 3000593 | 3/2016 | |
| EP | 3061601 | 8/2016 | |
| GB | 2174033 A * | 10/1986 | ........... A21C 11/106 |
| GB | 2228214 | 8/1990 | |
| GB | 2491190 | 11/2012 | |
| JP | 51024673 | 2/1976 | |
| JP | 63042850 | 2/1988 | |
| JP | 2088331 | 3/1990 | |
| JP | 10030287 | 2/1998 | |
| JP | 2000265589 | 9/2000 | |
| JP | 2002138375 | 5/2002 | |
| JP | 2004060061 | 2/2004 | |
| JP | 2005075953 | 3/2005 | |
| JP | 2005219504 | 8/2005 | |
| JP | 2008037060 | 2/2008 | |
| JP | 2011021094 | 2/2011 | |
| JP | 2011206998 | 10/2011 | |
| KR | 20110026567 | 3/2011 | |

OTHER PUBLICATIONS

European Patent Office, "Extended European Search Report," issued in connection with European Patent Application No. 17163790.3, dated Oct. 17, 2017, 7 pages.

European Patent Office, "Extended European Search Report," issued in connection with European Patent Application No. 17163795.2, dated Oct. 18, 2017, 13 pages.

Weinig, "Weinig Unimat 500: The All-Round Machine for Greater Flexibility in Profiling," retrieved from <https://web.archi ve.org/web/20160207205725/https://www.weinig.com/en/solid-wood/planing-machines-and-moulders/unimat-series/unimat-500.html> on Sep. 29, 2017, 3 pages.

United States Trademark and Patent Office, "Non-Final Office Action," issued in connection with U.S. Appl. No. 15/153,297, dated Mar. 13, 2018, 16 pages. (Copy riot provided as this is a

(56) References Cited

OTHER PUBLICATIONS

USPTO document. Applicant will provide document upon request from Examiner.).
United States Trademark and Patent Office, "Requirement for Restriction and/or Election," issued in connection with U.S. Appl. No. 15/153,338, dated Aprii 30, 2018, 7 pages. (Copy not provided as this is a USPTO document, Applicant will provide document upon request from Examiner.).
European Patent Office, "Extended European Search Report," issued in connection with European Patent Application No. 17163795.2, dated Mar. 2, 2018, 14 pages.
Zhang et al., "Roll Manufacturing of Polymer Microfluidic Devices Using a Roll Embossing Process," Sensors and Actuators A, 230 (2015), pp. 156-169, 14 pages.
United States Trademark and Patent Office, "Non-Final Office Action," issued in connection with U.S. Appl. No. 15/153,338, dated Aug. 27, 2018, 38 pages. (Copy not provided as this is a USPTO document. Applicant will provide document upon request from Examiner.).
United States Patent and Trademark Office, "Notice of Allowance," issued in connection with U.S. Appl. No. 15/153,297, dated Jul. 24, 2018, 27 pages. (Copy not provided as this is a USPTO document. Applicant will provide document upon request from Examiner.).
United States Patent and Trademark Office, "Final Office action," issued in connection with U.S. Appl. No. 15/153,338, dated Jan. 31, 2019, 26 pages. (Copy not provided as this is a USPTO document. Applicant will provide upon request by Examiner).
United States Patent and Trademark Office, Final Office Action, issued in connection with U.S. Appl. No. 15/153,266, dated May 2, 2019, 46 pages. (Copy not provided as this is a USPTO document. Applicant will provide document upon request from Examiner.).
United States Patent and Trademark Office, "Final Office action," issued in connection with U.S. Appl. No. 15/153,283, dated Apr. 29, 2019, 21 pages. (Copy not provided as this is a USPTO document. Applicant will provide document upon request from Examiner.).
European Patent Office, "Extended Search Report," issued in connection with European Patent Application No. 17163791.1, dated Oct. 12, 2017, 11 pages.
European Patent Office, "Extended Search Report," issued in connection with European Patent Application No. 17163792.9, dated Oct. 17, 2017, 10 pages.
European Patent Office, "Extended Search Report," issued in connection with European Patent Application No. 17163793.7, dated Oct. 16, 2017, 7 pages.
Definition "coil/coiling," Merriam-Webster dictionary, retrieved on Nov. 3, 2018 (Year:2018).
European Patent Office, "Extended European Search Report," issued in connection with European Patent Application No. 18202385.3, dated Jan. 24, 2019, 10 pages.
United States Patent and Trademark Office, "Final Office action," issued in connection with U.S. Appl. No. 15/153,252, dated Feb. 27, 2019, 15 pages. (Copy not provided as this is a USPTO document. Applicant will provide document upon request from Examiner.).
United States Patent and Trademark Office, "Non-Final Office action," issued in connection with U.S. Appl. No. 15/153,252, dated May 31, 2018, 18 pages. (Copy not provided as this is a USPTO document. Applicant will provide document upon request from Examiner.).
United States Patent and Trademark Office, "Non-final Office action," issued in connection with U.S. Appl. No. 15/153,266, dated Nov. 2, 2018, 20 pages. (Copy not provided as this is a USPTO document. Applicant will provide document upon request from Examiner.).
United States Patent and Trademark Office, "Restriction Requirement," issued in connection with U.S. Appl. No. 15/153,266, dated Jun. 28, 2018, 7 pages. (Copy not provided as this is a USPTO document. Applicant will provide document upon request from Examiner.).
United States Patent and Trademark Office, "Non-final Office action," issued in connection with U.S. Appl. No. 15/153,283, dated Nov. 9, 2018, 20 pages. (Copy not provided as this is a USPTO document. Applicant will provide document upon request from Examiner.).
United States Patent and Trademark Office, "Restriction Requirement," issued in connection with U.S. Appl. No. 15/153,283, dated Jul. 12, 2018, 8 pages. (Copy not provided as this is a USPTO document. Applicant will provide document upon request from Examiner.).
United States Patent and Trademark Office, "Non-Final Office Action," issued in connection with U.S. Appl. No. 15/153,338, dated Jun. 13, 2019, 24 pages. (Copy not provided as this is a USPTO document. Applicani will provide document upon request from Examiner.).
United States Patent and Trademark Office, "Non-Final Office Action," issued in connection with U.S. Appl. No. 15/153,266, dated Aug. 1, 2019, 32 pages. (Copy not provided as this is a USPTO document. Applicant will provide document upon request from Examiner.).
United States Patent and Trademark Office, "Notice of Allowance," issued in connection with U.S. Appl. No. 15/153,283, dated Aug. 19, 2019, 31 pages. (Copy not provided as this is a USPTO document. Applicant will provide document upon request from Examiner.).
United States Patent and Trademark Office, "Non-Final Office Action," issued in connection with U.S. Appl. No. 15/153,252, dated Sep. 13, 2019, 35 pages. (Copy not provided as this is a USPTO document. Applicant will provide document upon request from Examiner.).
European Patent Office, "Communication Pursuant to Article 94(3) EPC," issued in connection with application No. 17163791.1, dated Oct. 16, 2019, 4 pages.
United States Patent and Trademark Office, "Final Office Action," issued in connection with U.S. Appl. No. 15/153,338, dated Nov. 22, 2019, 14 pages. (Copy not provided as this is a USPTO document. Applicant will provide document upon request from Examiner.).
European Patent Office, "Extended European Search Report," issued in connection with European Application No. 19196880.9, dated Dec. 3, 2019, 7 pages.
United States Patent and Trademark Office, "Final Office Action," issued in connection with U.S. Appl. No. 15/153,252, dated Jan. 29, 2020, 46 pages. (Copy not provided as this is a USPTO document. Applicant will provide document upon request from Examiner.).
United States Patent and Trademark Office, "Advisory Action," issued in connection with U.S. Appl. No. 15/153,338, dated Mar. 16, 2020, 5 pages. (Copy not provided as this is a USPTO document. Applicant will provide Document upon request from Examiner.).

\* cited by examiner

METHODS AND APPARATUS TO FORM VENTING CHANNELS ON A PANEL FOR A DECORATIVE LAYER

CROSS-REFERENCE TO RELATED APPLICATIONS

This patent relates to subject matter disclosed in U.S. patent application Ser. No. 15/153,252 entitled "Methods and Apparatus to Couple a Decorative Layer to a Core Layer of a Panel via a Barrier Layer", U.S. patent application Ser. No. 15/153,266 entitled "Methods and Apparatus to Couple a Decorative Layer to a Panel via a High-Bond Adhesive Layer" U.S. patent application Ser. No. 15/153,283 (now U.S. Pat. No. 10,525,685) entitled "Methods and Apparatus to Couple a Decorative Composite Having a Reinforcing Layer to a Panel", U.S. patent application Ser. No. 15/153,297 (now U.S. Pat. No. 10173394) entitled "Methods and Apparatus to Vent Gas and Vapor from a Panel via Venting Channels for a Decorative Layer", and U.S. patent application Ser. No. 15/153,338 entitled "Methods and Apparatus to Remove Gas and Vapor from a Panel for a Decorative Layer", all of which were filed on May 12, 2016 and are incorporated herein by reference in their entireties.

FIELD OF THE DISCLOSURE

This patent relates generally to decorative layers and, more particularly, to methods and apparatus to form venting channels on a panel for a decorative layer.

BACKGROUND

Vehicles (e.g., aircraft, buses, trains, tractor-trailers, ships, etc.), buildings and/or other structures (e.g., billboards) include surfaces that are visible to the public. Oftentimes, these surfaces include decorative images for aesthetic, identification and/or advertising purposes. For example, some surfaces of aircraft include decorative images that identify an airline carrier associated with the aircraft. In some instances, the decorative images are formed on a decorative laminate that is coupled to the surface of the vehicle, building and/or other structure. A pocket of gas and/or vapor (e.g., water vapor) may form between the decorative laminate and the surface, thereby causing an adjacent portion of the decorative laminate to bubble.

SUMMARY

In one example, a method includes contacting an outer surface of a tool to an outer resin layer of a panel. The outer surface of the tool has protrusions. The example method includes moving the outer surface of the tool on the outer resin layer of the panel in a first direction to cause the protrusions of the tool to form first venting channels on the outer resin layer of the panel and coupling a decorative layer to the outer resin layer of the panel via an adhesive layer. The first venting channels have a depth greater than a thickness of the adhesive layer to impede the adhesive layer from filling the first venting channels. The first venting channels are to vent at least one of gas or vapor away from the decorative layer to deter the at least one of gas or vapor from exerting a pressure on the decorative layer to deter separation of a portion of the decorative layer from the outer resin layer.

In another example, an apparatus includes a tool. The tool includes an outer surface that is to engage and move along an outer resin layer of a panel. The tool includes protrusions defined on the outer surface that are to form one or more venting channels on the outer resin layer of the panel as the tool moves along the outer resin layer. The venting channels are formed by the protrusions to vent at least one of gas or vapor away from a decorative layer that is to couple to the panel via an adhesive layer to deter the at least one of gas or vapor from exerting a pressure on the decorative layer to deter separation of a portion of the decorative layer from the outer resin layer. The protrusions have a first depth that defines a second depth of the venting channels. The second depth is greater than a thickness of the adhesive layer to impede the adhesive layer from filling the venting channels.

In another example, an apparatus includes means for engaging an outer resin layer of a panel and means for forming venting channels in the outer resin layer. The means for forming is to form one or more venting channels in the outer resin layer as the means for engaging moves along the outer resin layer. The venting channels formed by the means for forming are to vent at least one of gas or vapor away from a decorative layer of the panel to deter the at least one of gas or vapor from exerting a pressure on the decorative layer to deter separation of a portion of the decorative layer from the outer resin layer. The venting channels have a depth greater than a thickness of the adhesive layer to impede the adhesive layer from filling the venting channels.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
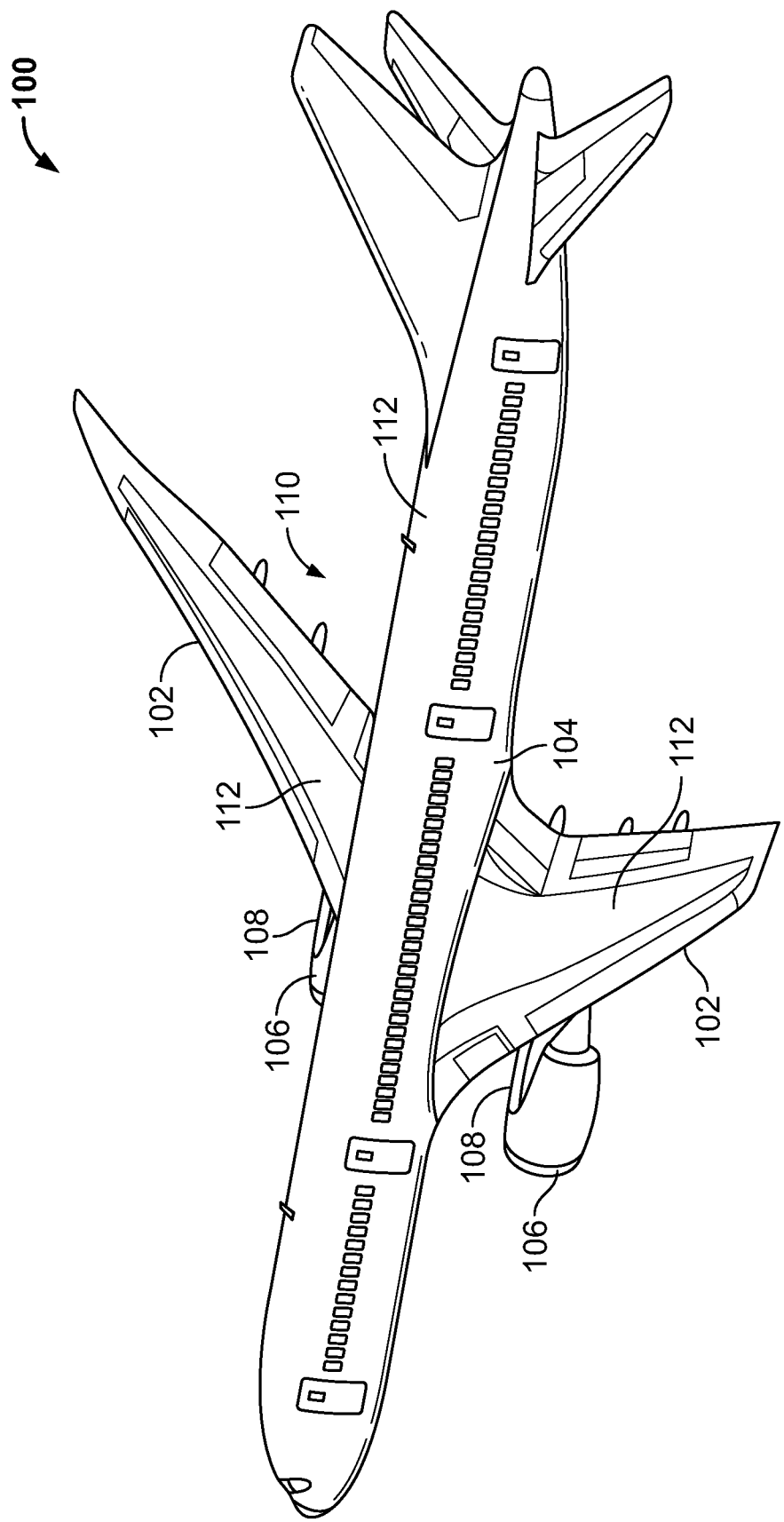
FIG. 1 depicts an example aircraft in accordance with the teachings herein.

Surfaces in public spaces (e.g., billboards, building walls, vehicle panels, etc.) oftentimes include decorative images for aesthetic, informational, and/or advertising purposes. For example, known aircraft and/or other vehicles (e.g., buses, trains, tractor-trailers, ships, etc.) often include decorative images on their surfaces for identification and/or advertising purposes. In some examples, the visible surfaces of aircraft interiors include decorative images that identify respective airline carriers associated with the aircraft.

Some known decorative images are formed on a decorative layer (e.g., a decorative laminate) that is coupled to a corresponding surface. For example, decorative layers are coupled to panels of aircraft via an adhesive layer. In some instances, a portion of the decorative layer or laminate may separate from the surface to which it is coupled. For example, a pocket of gas and/or vapor (e.g., water vapor) may form between the decorative laminate and the surface, thereby causing an adjacent portion of the decorative laminate to bubble. Such separation between the decorative laminate and the surface may be undesirable for aesthetic purposes (e.g., bubbling of the decorative laminate may be aesthetically unappealing) and/or may cause the decorative laminate to become damaged and/or to further separate (e.g., delaminate) from the surface over time.

In some instances, pockets of gas and/or vapor are entrapped between a decorative laminate and a surface of a panel (e.g., an interior surface in a compartment of the aircraft such as a surface of a bin, a lining, furnishings, etc.) when the decorative laminate is initially coupled to the surface. That is, the separation results from the decorative laminate not being laid flush with the surface when the decorative laminate is initially coupled to the surface.

In other instances, the pockets of gas and/or vapor that cause separation between the decorative laminate and the surface form as a result of the gas and/or vapor escaping from material of the panel and becoming trapped (e.g., to form a bubble) between the decorative laminate and the panel. When a decorative laminate is coupled to a panel of an aircraft, gas and/or vapor (e.g., water vapor) may be emitted from a core layer (e.g., a honeycomb core, a foam core, etc.) of the panel and subsequently become trapped between the decorative laminate and the surface of the panel. For example, the gas and/or vapor may escape and/or be emitted from the core layer of the panel when there is difference in pressure and/or temperature between the core layer of the panel and the environment exterior to the panel. For example, the gas and/or vapor may migrate from the core layer toward the decorative laminate when pressure closer to the core layer is greater than pressure closer to the decorative laminate. The gas and/or vapor becomes trapped between the decorative laminate as a result of the decorative laminate being composed of substantially impermeable and/or nonporous material that deters and/or impedes the gas and/or vapor of the core layer from traversing therethrough. The trapped gas and/or vapor creates an internal pressure between the decorative laminate and the panel that applies a concentrated force to the decorative laminate and/or the surface, thereby causing the decorative laminate to separate from the surface of the panel (e.g., from the interior surface in the aircraft compartment, etc.). Additionally or alternatively, the gas and/or vapor that is trapped between the decorative laminate and the panel may originate from an interaction (e.g., a chemical reaction, a physical reaction, etc.) between components of the panel and/or the decorative laminate such as between the core layer and a reinforcing layer of the panel, between the reinforcing layer and an adhesive coupled to the decorative laminate, etc.

To deter and/or impede gas and/or vapor from causing a portion of a decorative layer coupled to a panel from separating from the panel, the example methods and apparatus disclosed herein include forming one or more venting channels in the panel that vent gas and/or vapor (e.g., water vapor) away from the decorative layer. For example, the venting channels are formed in an outer resin layer of the panel so that the venting channels are disposed between the decorative layer and a core layer of the panel. As a result, the venting channels deter and/or impede gas and/or vapor emitted from the core layer of the panel from reaching the decorative layer and creating an internal pressure between the decorative layer and the outer resin layer of the panel. Thus, the venting channels deter and/or impede the gas and/or vapor from exerting a pressure and/or a force on a portion of the decorative layer to deter and/or impede the decorative layer from separating from the panel (e.g., to deter and/or impede the decorative layer from bubbling).

In the examples disclosed herein, the venting channels are formed by a tool that includes an outer surface to engage and move along the outer resin layer of the panel. The outer surface of the tool defines protrusions that are to form the venting channels on the outer resin layer as the tool moves along the outer resin layer. The protrusions have a first depth that defines a second depth of the venting channels. The second depth of the venting channels is greater than a thickness of an adhesive layer that couples the decorative layer to the panel to deter and/or impede the adhesive layer from filling the venting channels and, thus, prohibiting the venting channels from venting the gas and/or vapor away from the decorative layer. The protrusions have, for example, arcuate, circular, elliptical, and/or polygonal cross-sections that form corresponding arcuate, circular, elliptical, and/or polygonal cross-sections of the venting channels. In some examples, a coating of moisture absorption material is applied to the outer resin layer of the panel. The moisture absorption material (e.g., moisture scavenging material such as silica gel) captures and/or absorbs gas and/or vapor that is emitted from the panel to further deter and/or impede separation of the portion of the decorative layer from the outer resin layer by deterring and/or impeding the gas and/or vapor from reaching the decorative layer.

In some examples, the tool is a roller that rotates about a longitudinal axis of the roller to move (e.g., roll) along the outer resin layer of the panel to form the venting channels on the panel. In some such examples, the protrusions of the roller extend radially along the outer surface of the roller about the longitudinal axis of the roller. As the roller moves along the outer resin layer of the panel in a first direction, the protrusions form the venting channels so that the venting channels extend in the first direction. In other such examples, the protrusions extend along a length of the roller in a direction that is approximately parallel to the longitudinal axis of the roller. As the roller moves along the outer resin layer in the first direction, the longitudinally extending protrusions form the venting channels that extend in a second direction approximately perpendicular to the first direction. The length of some example rollers having the longitudinally extending protrusions is greater than a width of the outer resin layer of the panel to enable the roller to form one or more venting channels that extend the entire width of the outer resin layer.

In other examples, the tool includes a belt. The protrusions extend along a length of the belt so that the venting channels are formed as the belt slides along the outer resin layer of the panel. For example, the belt slides along the outer resin layer in a first direction that is approximately parallel to the length of the belt to form one or more venting channels that extend in the first direction.

In some examples disclosed herein, the venting channels formed by the tool may include first venting channels and second venting channels. For example, upon forming the first venting channels, the tool is repositioned on and subsequently moved along the outer resin layer of the panel to form the second venting channels. In some examples, the second venting channels extend in the same direction (e.g., the first direction) as the first venting channels (e.g., the second venting channels are adjacent and approximately parallel to the first venting channels). In other examples, an orientation of the tool is changed relative the outer resin layer upon forming the first venting channels so that the second venting channels formed by the tool extend in a second direction different than (e.g., approximately perpendicular to) the first direction.

In some examples, the tool is a handheld device that enables the venting channels to be formed (e.g., reformed, repaired, etc.) in a field environment. For example, in the field environment, the decorative layer is decoupled from the panel by removing the adhesive layer from the outer resin layer of the panel. The venting channels are subsequently formed on the outer resin layer via the handheld device, and the decorative layer is coupled to the panel by reapplying the adhesive layer to the outer resin layer of the panel.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110 (e.g., a cargo compartment, a passenger compartment, a flight deck, etc.) is disposed within the fuselage 104 of the illustrated example. The wings 102 and the fuselage 104 define an outer surface 112 of the aircraft 100.

Figure 2A:
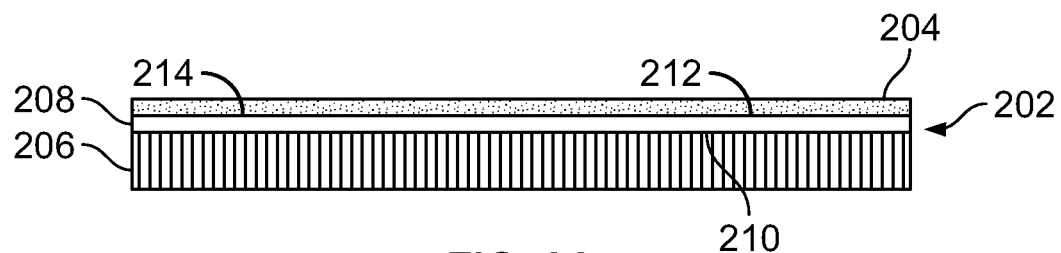
FIG. 2A is a cross-sectional view of a known decorative layer and a portion of a known panel.
Figure 2B:
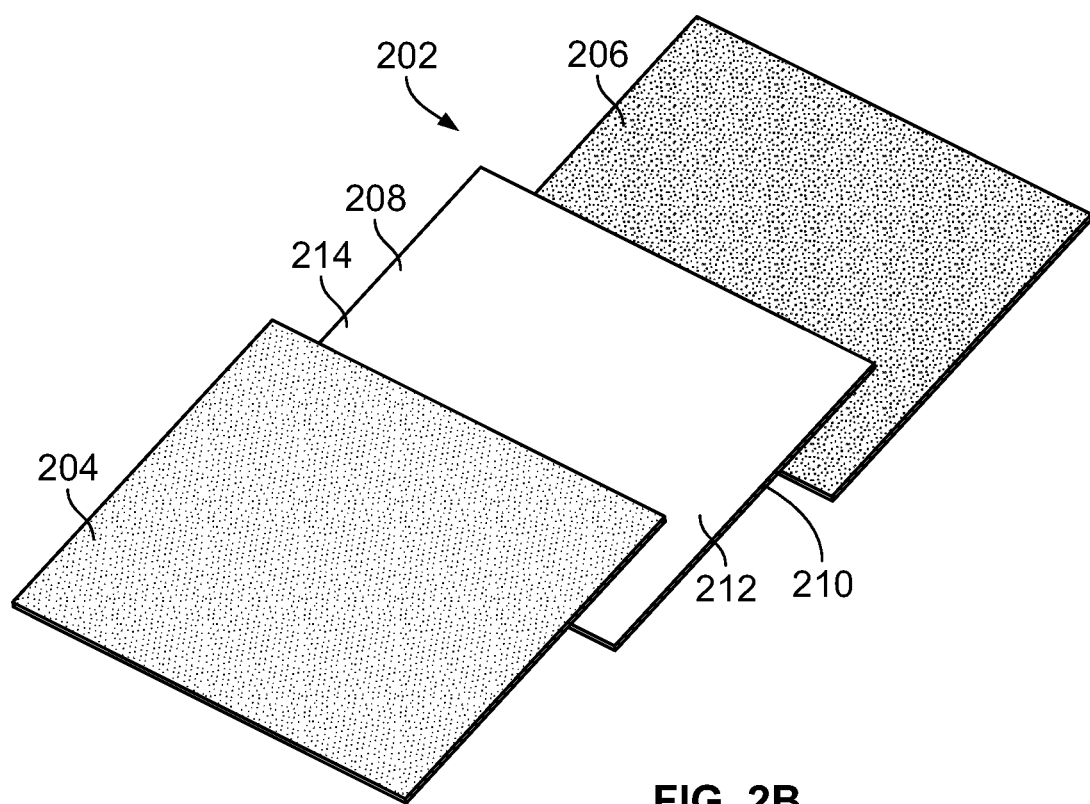
FIG. 2B is an exploded view of the known decorative layer and the portion of the known panel of FIG. 2A.

Before discussing the example decorative layers and the example panels disclosed herein, a brief description of a known panel 202 and a known decorative layer 204 is provided in connection with FIGS. 2A and 2B. More specifically, FIG. 2A is a cross-sectional view of the known decorative layer 204 and a portion of the known panel 202, and FIG. 2B is an exploded view of the known decorative layer 204 and the portion of the known panel 202.

As illustrated in FIGS. 2A and 2B, the known panel 202 includes a core layer 206 and a reinforcing layer 208 coupled to the core layer 206. A first surface 210 of the reinforcing layer 208 engages the core layer 206, and an opposing second surface 212 defines a surface 214 of the panel 202.

The reinforcing layer 208 of the known panel 202 may be composed of materials that are partially porous and/or permeable (e.g., resin, reinforcing fiber, etc.) such that some gas and/or vapor (e.g., water vapor) may traverse through the reinforcing layer 208. Further, while not shown in the portion of the known panel 202 illustrated in FIGS. 2A and 2B, another reinforcing layer engages another surface of the core layer 206 opposite the reinforcing layer 208 such that a sandwich-structured composite is formed by the reinforcing layer 208, the core layer 206, and the other opposing reinforcing layer.

Further, the known decorative layer 204 includes decorative features (e.g., colors, patterns, logos, text, etc.) that are to be displayed on the known panel 202. As illustrated in FIG. 2A, the decorative layer 204 is coupled to the surface 214 of the panel 202 to enable the decorative features of the decorative layer 204 to be displayed on the panel 202. For example, the decorative layer 204 is adhesively coupled to the second surface 212 of the reinforcing layer 208.

In some instances, gas and/or vapor (e.g., water vapor) is trapped within the core layer 206 of the panel 202 (e.g., trapped between the reinforcing layer 208 and the opposing reinforcing layer of a sandwich-structured composite of the panel 202). When a difference in pressure and/or temperature between the core layer 206 and the environment exterior to the panel 202 occurs (e.g., when pressure closer to the core layer 206 is greater than pressure closer to the decorative layer 204), the gas and/or vapor escape and/or are emitted from the core layer 206 of the panel 202. In other instances, gas and/or vapor of the panel 202 may originate from an interaction (e.g., a chemical reaction, a physical reaction, etc.) between material of the core layer 206 (e.g., a honeycomb core, a foam core, resin, reinforcing fiber, etc.) and/or the decorative layer 204 (e.g., a decorative laminate, an adhesive layer, etc.).

Because the decorative layer 204 coupled to the panel 202 is composed of substantially impermeable and/or nonporous material, the vapor and/or gas that is emitted from the core layer 206 traverses through the reinforcing layer 208 and becomes trapped between the decorative layer 204 and the surface 214 of the panel 202. The trapped vapor and/or gas create an internal pressure that applies a concentrated force to an adjacent portion of the decorative layer 204 and/or the surface 214 of the panel 202. For example, the applied force pushes a portion of the decorative layer 204 away from the surface 214 of the panel 202, thereby causing the portion of the decorative layer 204 to separate from the panel 202. In other words, vapor and/or gas of the known panel 202 may form bubbles in the known decorative layer 204 that are aesthetically unappealing and/or which damage the decorative layer 204.

Figure 3:
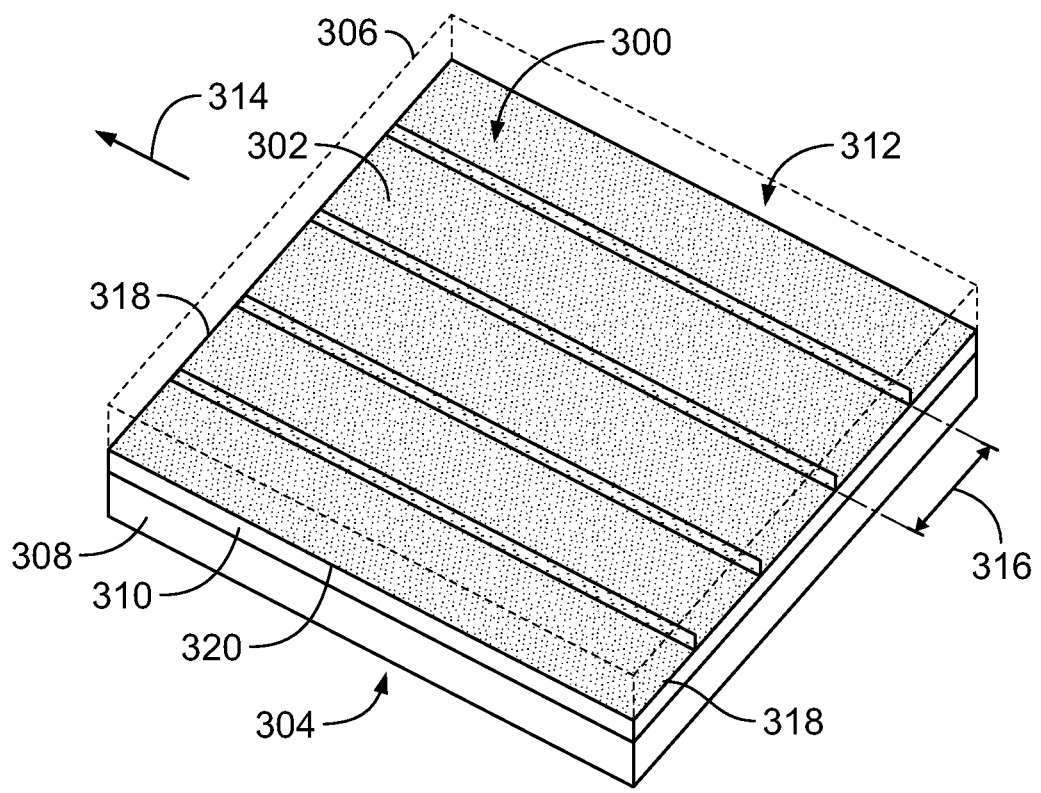
FIG. 3 illustrates example one or more venting channels formed on an example outer resin layer of a panel in accordance with the teachings disclosed herein.

FIG. 3 illustrates example one or more venting channels 300 formed on an outer resin layer 302 of an example panel 304 in accordance with the teachings disclosed herein. When a decorative layer 306 is coupled to the outer resin layer 302 of the panel 304, the venting channels 300 vent gas and/or vapor (e.g., water vapor) that originates from the panel 304 (e.g., from a core layer 308 of the panel 304) away from the decorative layer 306 to deter and/or impede the gas and/or vapor from causing a portion of the decorative layer 306 from separating from the panel 304 (e.g., the venting channels 300 deter and/or impede the decorative layer 306 from bubbling).

In the illustrated example, the panel 304 on which the venting channels 300 are formed includes the core layer 308 and a reinforcing layer 310. The core layer 308 is composed of, for example, a honeycomb core, a foam core and/or a combination thereof. In some such examples, the core layer 308 includes a honeycomb core and foam material that fills openings of the honeycomb core. The material(s) of the core layer 308 are lightweight and the structure of the core layer 308 (e.g., the honeycomb pattern) provides flexural strength (e.g., bending stiffness) to the panel 304. Thus, the core layer 308 provides flexural strength to the panel 304 without adding a significant amount of weight to the panel 304 and, thus, to the structure of which the panel 304 forms a surface (e.g., the outer surface 112 of the aircraft 100 of FIG. 1 and/or a surface of a bin (e.g., a stow-bin), a lining (e.g., of a sidewall, a ceiling, etc.), furnishings (e.g., a monument, a closet, a crew-rest, a lavatory, etc.) located in the compartment 110 of the aircraft 100 of FIG. 1, etc.).

The reinforcing layer 310 of the example panel 304 includes a fiber reinforcing layer that is, for example, composed of fiberglass, graphite-cloth, synthetic fiber (e.g., Aramid fiber), natural fiber, (e.g., wood, flax, cellulose, jute, hemp, straw, switch grass, kenaf, cotton, coir, bamboo, etc.), a combination thereof and/or any other material that reinforces the core layer 308 (e.g., by providing compression strength to the panel 304). Further, the reinforcing layer 310 includes the outer resin layer 302 that is composed of, for example, phenolic resin. In some examples, the reinforcing layer 310 is a pre-impregnated layer (i.e., prepreg) in which the fiber reinforcing layer is pre-impregnated with resin (e.g., resin of the outer resin layer 302). The pre-impregnated resin is pre-dried but not yet cured upon formation of the reinforcing layer 310. Further, while FIG. 3 shows a reinforcing layer (e.g., the reinforcing layer 310) coupled to one side of the core layer 308 of the panel 304, another reinforcing layer (e.g., substantially similar or identical to the reinforcing layer 310) not shown in FIG. 3 is coupled to another surface of the core layer 308 opposite the reinforcing layer 310 such that the panel 304 is a sandwich-structured composite formed by the reinforcing layer 310, the core layer 308, and the other opposing reinforcing layer.

Gas and/or vapor (e.g., water vapor) initially is trapped within the core layer 308 of the panel 304 (e.g., between the reinforcing layer 310 and the other opposing reinforcing layer of the sandwich-structured panel 304) and subsequently may escape and/or be emitted from the core layer 308 when there is a difference in pressure (e.g., when pressure closer to the core layer 308 is greater than pressure closer to the decorative layer 306) and/or temperature between the core layer 308 and the environment exterior to the panel 304. In other instances, gas and/or vapor may be emitted from the panel 304 as a result of curing material(s) of the panel 304, characteristics of the material(s) of the panel 304 and/or an interaction (e.g., a chemical reaction, a physical reaction, etc.) between different materials of the panel 304. Further, the reinforcing layer 310 is permeable and/or porous. As a result, gas and/or vapor may be emitted from the core layer 308, traverse through the permeable material of the reinforcing layer 310, and reach the decorative layer 306 coupled to the panel 304.

The venting channels 300 of the illustrated example are formed on the outer resin layer 302 so that the venting channels 300 are disposed between the core layer 308 and the decorative layer 306 coupled to the panel 304. The venting channels 300 distribute gas and/or vapor emitted from the panel 304 to reduce concentrated forces that may result from the gas and/or vapor being trapped between the decorative layer 306 and the reinforcing layer 310. Thus, the venting channels 300 deter and/or impede a portion of the decorative layer 306 from separating from the panel 304 and/or substantially reduce a distance of separation between the decorative layer 306 and the panel 304. In the illustrated example, the venting channels 300 vent the gas and/or vapor that originates from the panel 304 away from the decorative layer 306 to further deter and/or impede the gas and/or vapor from becoming trapped between the panel 304 and the decorative layer 306 and exerting a pressure on the decorative layer 306. Thus, by venting the gas and/or vapor away from the decorative layer 306, the venting channels 300 of the illustrated example deter and/or impede a portion of the decorative layer 306 from separating from the outer resin layer 302 of the panel 304 (e.g., the venting channels 300 deter and/or impede bubbling of the decorative layer 306). Additionally, in the illustrated example, a coating 312 of moisture absorption material (e.g., moisture scavenging material such as silica gel) is applied to the outer resin layer 302 of the panel 304 to further deter and/or impede the gas and/or vapor from causing the decorative layer 306 to separate from the panel 304. The moisture absorption material of the coating 312 captures and/or absorbs gas and/or vapor that originates from the panel 304 to deter and/or impede the gas and/or vapor from reaching the decorative layer 306 and, thus, deter and/or impede the decorative layer 306 from separating from the panel 304.

As illustrated in FIG. 3, each of the venting channels 300 extends in a direction 314 (e.g., a first direction) and, thus, is approximately parallel to each of the other venting channels 300. For example, the venting channels 300 are spaced apart equidistantly by a distance 316 of about between 0.125 inches (3.175 millimeters) and 2 inches (50.8 millimeters). In other examples, the venting channels 300 may be spaced apart non-equidistantly from each other. Further, the example venting channels 300 extend to outer edges 318 of the outer resin layer 302 to enable the venting channels 300 to vent the gas and/or vapor away from the decorative layer 306.

In the illustrated example, the decorative layer 306 is coupled to the outer resin layer 302 via an adhesive layer 320. The venting channels 300 have a depth (e.g., a depth 814 of FIG. 8) that is greater than a thickness of the adhesive layer 320 to deter and/or impede the adhesive layer 320 from filling the venting channels 300 and, thus, prohibiting the venting channels 300 from venting the gas and/or vapor away from the decorative layer 306. Further, the depth of the venting channels 300 formed on the outer resin layer 302 is small enough to deter and/or impede the venting channels 300 from damaging the fiber reinforcing layer of the reinforcing layer 310 and/or from being visible when the decorative layer 306 is coupled to the panel 304. For example, the depth of the venting channels 300 is about between 0.01 inches (0.15 millimeters) and 0.039 inches (1 millimeter) to deter and/or impede the adhesive layer 320 from filling the venting channels 300. Further, the venting channels 300 have a width (e.g., a width 812 of FIG. 8), for example, of about between 0.01 inches (0.15 millimeters) and 0.039 inches (1 millimeter) that enables the venting channels 300 to sufficiently vent the gas and/or vapor away from the decorative layer 306.

Figure 4A:
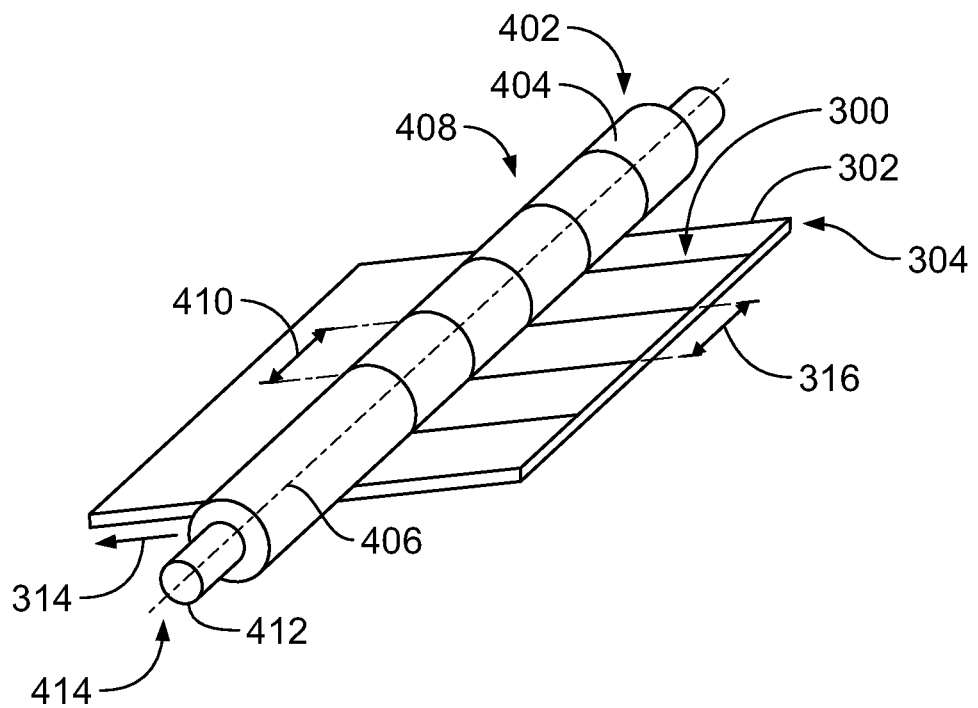
FIG. 4A is an example tool to form the venting channels of FIG. 3 in accordance with the teachings disclosed herein.

FIG. 4A is an example tool 400 that forms the venting channels 300 on the outer resin layer 302 in accordance with the teachings disclosed herein. As illustrated in FIG. 4A, the tool 400 includes a body 402 that defines an outer surface 404. In the illustrated example, the tool 400 is a roller in which the body 402 is a cylinder that extends along a longitudinal axis 406.

Protrusions 408 are defined on the outer surface 404 of the tool 400. In the illustrated example, the protrusions 408 extend radially along the outer surface 404 about the longitudinal axis 406 of the tool 400. Because the venting channels 300 are formed by the protrusions 408 of the tool 400, the venting channels 300 have substantially similar dimensions and/or cross-sections as the protrusions 408. For example, the protrusions 408 have a depth and/or a width of about between 0.01 inches (0.15 millimeters) and 0.039 inches (1 millimeter) to form the venting channels 300 that have identical or substantially similar dimensions. Additionally, the protrusions 408 are spaced apart by a distance 410 that is substantially equal to the distance 316 to enable the tool 400 to form the venting channels 300 that are spaced apart by the distance 316. For example, the protrusions 408 are spaced apart equidistantly by about between 0.125 inches (3.175 millimeters) and 2 inches (50.8 millimeters). Further, the tool 400 is composed of a material having a hardness (e.g., a substantially non-malleable material such as steel) that deters and/or impedes the protrusions 408 and, more generally, the tool 400 from deforming as the tool 400 engages the outer resin layer 302 to form the venting channels 300. For example, the tool 400 may be composed of steel to form the venting channels 300 on the outer resin layer 302 that is composed of phenolic resin.

In some examples, the tool 400 and the protrusions 408 are an integrally-formed, unitary structure. In such examples, the tool 500 and the protrusions may be formed via additive manufacturing (e.g., 3D printing), forging, casting, machining and/or any other manufacturing process in which the tool 400 and the protrusions 408 are integrally-formed. In other examples, the protrusions 408 are removably coupled to the tool 400. For example, the protrusions 408 are strips and/or disks (e.g., flywheels) that are fastenably inserted into slots defined along the outer surface 404 of the tool 400 to couple the protrusions 408 to the tool 400. In such examples, the protrusions 408 may be decoupled from the tool 400 (e.g., removed from the slots of the outer surface 404) to enable the protrusions 408 to be repaired and/or replaced (e.g., replaced with protrusions having a different cross-section than the preceding protrusions).

As illustrated in FIG. 4A, the outer surface 404 of the tool 400 contacts the outer resin layer 302 to form the venting channels 300 of the panel 304. For example, the tool 400 moves (e.g., rolls, rotates, etc.) along the outer resin layer 302 as a force and/or pressure is applied to the outer resin layer 302 via the tool 400 to imprint and/or otherwise form the venting channels 300 on the outer resin layer 302 of the panel 304. In the illustrated example, because the protrusions 408 extend radially about the longitudinal axis 406 of the tool 400, the tool 400 forms the venting channels 300 to extend in the direction 314 as the tool 400 rolls, rotates and/or otherwise moves in the same direction 314.

In the above examples, the tool 400 is utilized to form the venting channels 300 on the panel 304 in a factory environment. For example, the tool 400 forms the venting channels 300 in a manufacturing process before the decorative layer 306 (FIG. 3) is coupled to the panel 304. When the tool 400 is utilized in a factory environment, the tool 400 may have a length of up to about 6 feet (0.305 meters), for example, to form venting channels (e.g., the venting channels 300) on a panel (e.g., the panel 304) that has a width of up to about 5 feet (0.305 meters).

In the illustrated example, the tool 400 is a handheld device that includes a handle 412 at each end 414 of the tool 400. The handles 412 enable the tool 400 to be used by a technician in a field environment to repair damaged venting channels. For example, if the venting channels 300 become damaged, the technician may decouple the decorative layer 306 from the panel 304 by removing the adhesive layer 320 from the outer resin layer 302, form and/or reform the venting channels 300 on the outer resin layer 302 via the handheld tool 400, and subsequently recouple the decorative layer 306 to the panel 304 without having to return the structure to which the panel 304 is coupled (e.g., the aircraft 100 of FIG. 1) to the factory environment. Upon forming the venting channels 300 (e.g., first venting channels), the handheld tool 400 may be repositioned on the panel 304 to form additional one or more venting channels (e.g., second venting channels substantially similar or identical to the venting channels 300). For example, the additional venting channels are spaced apart from the venting channels 300 and extend in the same direction 314 so that the additional venting channels are approximately parallel to the venting channels 300. Additionally or alternatively, the handheld tool 400 may be used to form the venting channels 300 in a manufacturing process before the decorative layer 306 is coupled to the panel 304.

Figure 4B:
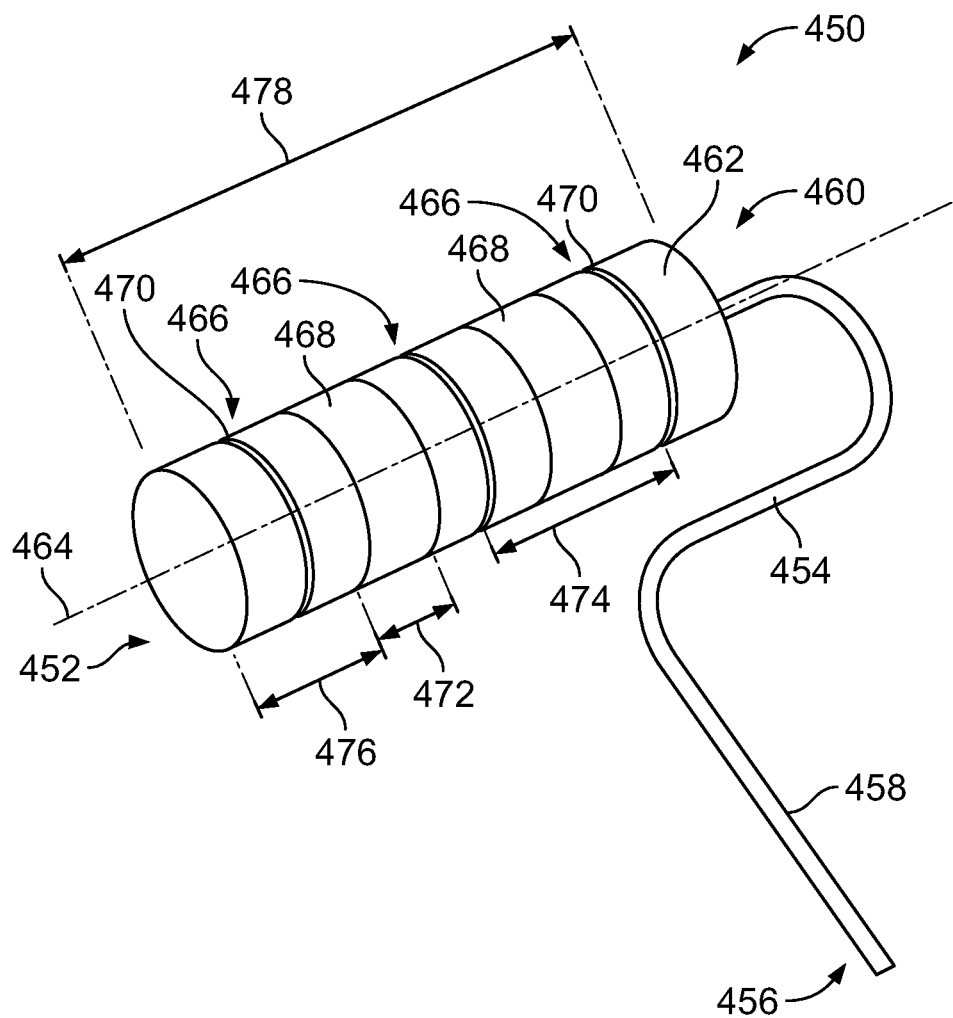
FIG. 4B is another example tool to form the venting channels of FIG. 3 in accordance with the teachings herein.

FIG. 4B is another example tool 450 that forms the venting channels 300 (FIG. 3) on the outer resin layer 302 (FIG. 3) in accordance with the teachings disclosed herein. The example tool 450 of FIG. 4B is similar to the example tool 400 of FIG. 4A. Thus, because the tool 400 is described in detail in connection with FIG. 4A, some characteristics (e.g., materials, dimensions, manufacturing of, etc.) of the tool 450 of FIG. 4B are not described in further detail below.

As illustrated in FIG. 4B, the tool 450 includes a body 452 and a hook-shaped holder 454 (e.g., a J-shaped holder). In some examples, the body 452 of the tool 450 is identical or substantially similar to the body 402 of FIG. 4A such that the body 402 may be coupled to the hook-shaped holder 454 to form the tool of FIG. 5B. In the illustrated example, a first end 456 of the hook-shaped holder 454 defines an ergonomic handle 458 that enables a technician to hold the tool 450 to form the venting channels 300 in the outer resin layer 302. An opposing second end 460 of the hook-shaped holder 454 receives the body 452 of the tool 450. As illustrated in FIG. 4B, the tool 450 is a roller in which the body 452 is a cylinder. The body 452 defines an outer surface 462 and extends along a longitudinal axis 464 of the second end 460 of the hook-shaped holder 454. In the illustrated example, the body 452 of the tool 450 is composed of body portions 466, 468 that are positioned side-by-side along the second end 460 of the hook-shaped holder 454 to form the cylindrically-shaped body 452. For example, each of the body portions 466, 468 defines an aperture that extends along the longitudinal axis 464 and receives the second end 460 of the hook-shaped holder 454 to couple to the hook-shaped holder 454. In other examples, the body 452 is an integrally-formed, unitary structure.

As illustrated in FIG. 4B, the body portions 466 (e.g., first body portions) include protrusions 470 that extend radially along the outer surface 462 about the longitudinal axis 464 of the tool 450. In the illustrated example, each of the body portions 466 defines one of the protrusions 470. In other examples, one or more of the body portions 466 may include a plurality of the protrusions 470. The protrusions 470 form the venting channels 300 on the outer resin layer 302 and, thus, the venting channels 300 have substantially similar dimensions and/or cross-sections as the protrusions 470. Further, the outer surface 462 of each of the body portions 468 (e.g., second body portions) are substantially flat without any protrusions.

In the illustrated example, the body portions 466 with the protrusions 470 and the body portions 468 without the protrusions are positioned in an alternating fashion such that one of the body portions 468 is positioned between two of the body portions 466. As a result, a width 472 of the body portion 408 defines, in part, a distance between the protrusions 470 of the tool 450. In the illustrated example, the width 472 of each of the body portions 468 is substantially uniform and a width 476 of each of the body portions 466 is substantially uniform so that the protrusions 470 are spaced apart equidistantly by the distance 474. In other examples, the width 472 of the body portion 468 and/or the width 476 of the body portion 466 may vary so that the protrusions are not spaced apart equidistantly. Additionally or alternatively, more (e.g., 2, 3, 4, 5, etc.) or less (e.g., 0) of the body protrusions 468 may be positioned between one or more of adjacent pairs of the body portions 466 to affect the distance 474 between the protrusions 470 and, thus, affect an amount of gas and/or vapor that may be vented via venting channels formed by the protrusions 470. Further, more or less of the body portions 466 and/or the body portions 468 may be included to form the body 452 of the tool 450 to affect a width 478 of the body 452 of the tool 450 and/or a number of the protrusions 470 included on the outer surface 462 of the body 452 of the tool 450. For example, increasing the width 478 of the body 452 increases a surface area on which the tool 450 forms venting channels, and increasing the number of the protrusions 470 increases the number of venting channels that tool 450 forms.

Moreover, because the body 452 of the tool 450 is formed by a plurality of body portions (e.g., a plurality of the body portions 466 and/or a plurality of the body portions 468) that are separable, the example tool 450 enables localized repair of one or more of the body portions 466, 468. For example, if the protrusion 470 of one of the body portions 466 becomes damaged, that body portion 466 may be replaced and/or repaired without having to replace and/or repair the other body portions 466, 468 of the body 452.

To form the venting channels 300 of the panel 304, the outer surface 462 of the example tool 450 contacts the outer resin layer 302. For example, the tool 450 moves (e.g., rolls, rotates, etc.) along the outer resin layer 302 as a force and/or pressure is applied to the outer resin layer 302 via the tool 450 to enable the tool 450 to imprint and/or otherwise form the venting channels 300 on the outer resin layer 302 of the panel 304. In the illustrated example, the tool 450 forms the venting channels 300 to extend in the direction 314 (FIG. 3) as the tool 450 rolls, rotates and/or otherwise moves in the same direction 314. The tool 450 may be utilized to form the venting channels 300 on the panel 304 in a factory environment. For example, the tool 400 forms the venting channels 300 in a manufacturing process before the decorative layer 306 (FIG. 3) is coupled to the panel 304. Additionally or alternatively, the tool 450 may be used by a technician to form and/or repair the venting channels 300 in a field environment. For example, if the venting channels 300 become damaged, the technician may decouple the decorative layer 306 from the panel 304, form and/or reform the venting channels 300 on the outer resin layer 302 via the handheld tool 450, and subsequently recouple the decorative layer 306 to the panel 304 without having to return the structure to which the panel 304 is coupled (e.g., the aircraft 100 of FIG. 1) to the factory environment.

Figure 5:
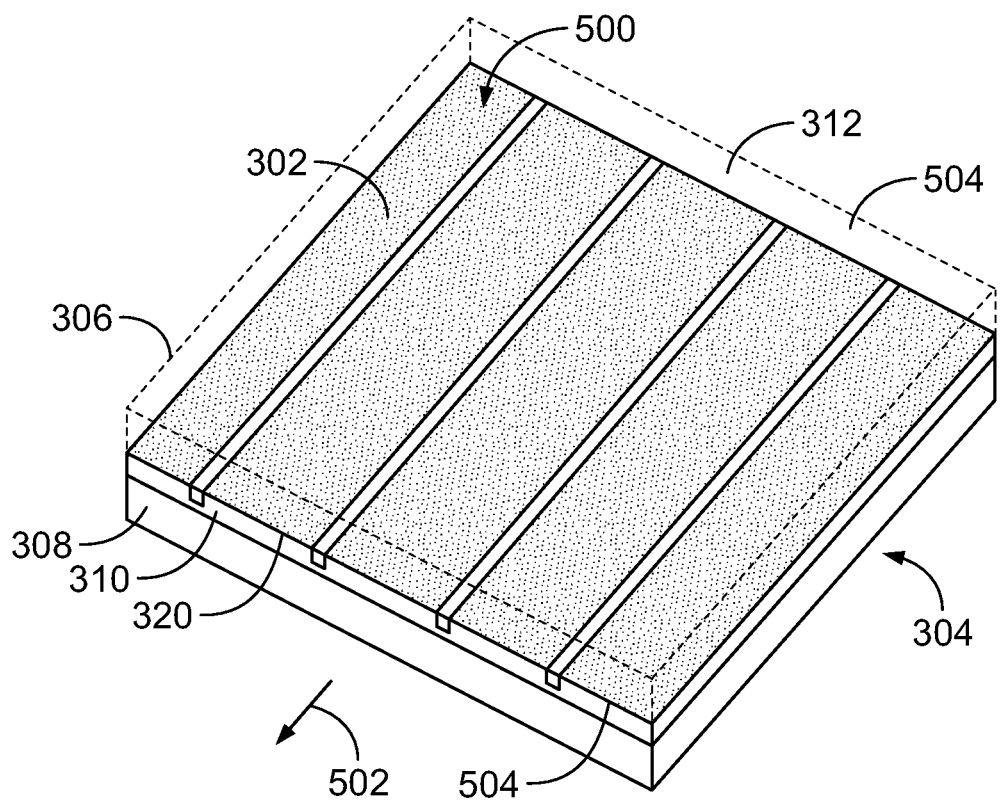
FIG. 5 illustrates other example one or more venting channels formed on the outer resin layer of FIG. 3 in accordance with the teachings disclosed herein.

FIG. 5 illustrates other example one or more venting channels 500 formed on the outer resin layer 302 in accordance with the teachings disclosed herein. When the decorative layer 306 is coupled to the outer resin layer 302 of the panel 304, the venting channels 500 vent gas and/or vapor (e.g., water vapor) that originates from the panel 304 away from the decorative layer 306 to deter and/or impede the gas and/or vapor from causing a portion of the decorative layer 306 from separating from the panel 304 (e.g., the venting channels 500 deter and/or impede the decorative layer 306 from bubbling).

The panel 304 (e.g., the outer resin layer 302, the core layer 308, the reinforcing layer 310, the other reinforcing layer of the sandwich-structured composite opposite the reinforcing layer 310, the coating 312) and the decorative layer 306 (e.g., the adhesive layer 320) of FIG. 5 are substantially similar or identical to those components having the same reference numbers in FIG. 3. Further, the venting channels 500 of FIG. 5 are substantially similar or identical to the venting channels 300 of FIGS. 3 and 4A. Because the venting channels 300 are described in detail in connection with FIG. 3, some characteristics of the venting channels 500 of FIG. 5 are not described in further detail below.

In the illustrated example, each of the one or more venting channels 500 extends in a direction 502 (e.g., a second direction) and, thus, is approximately parallel to each of the other venting channels 500. Further, the example venting channels 500 extend to outer edges 504 of the outer resin layer 302 to enable the venting channels 500 to vent the gas and/or vapor away from the decorative layer 306. For example, the venting channels 500 are formed on the outer resin layer 302 so that the venting channels 500 are disposed between the core layer 308 and the decorative layer 306 coupled to the panel 304. The venting channels 500 vent the gas and/or vapor that originates from the panel 304 away from the decorative layer 306 to deter and/or impede the gas and/or vapor from forming an internal pressure between the panel 304 and the decorative layer 306, thereby deterring and/or impeding a portion of the decorative layer 306 from separating from the panel 304 (e.g., to deter and/or impede bubbling of the decorative layer 306).

Figure 6:
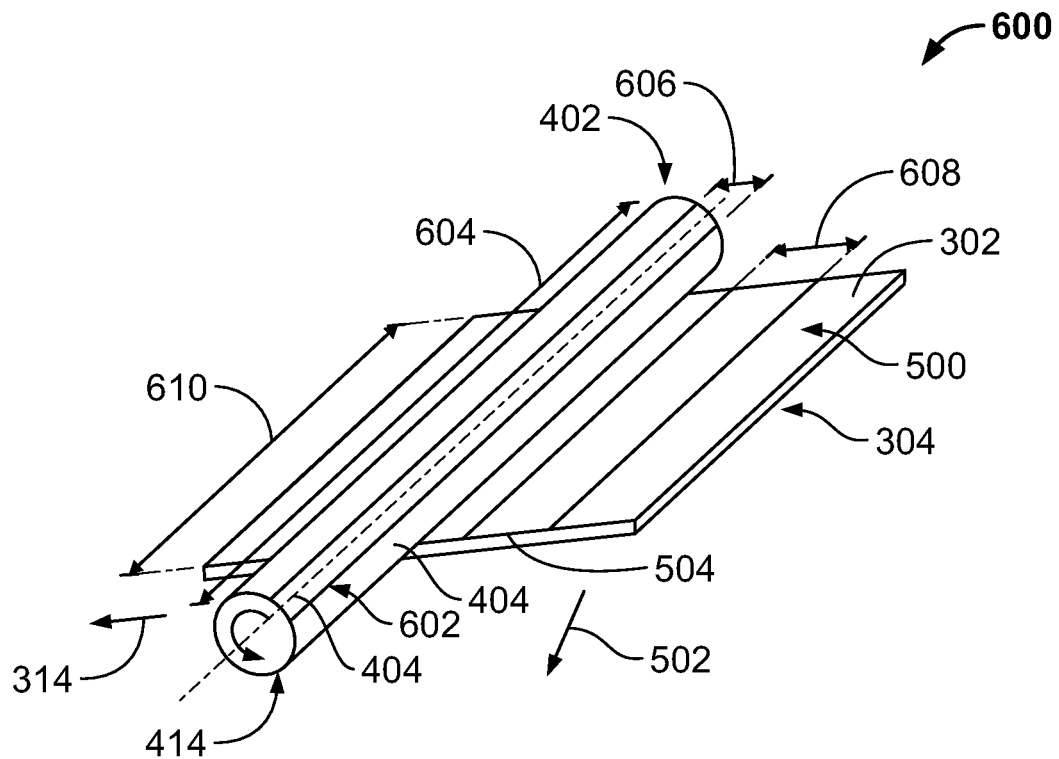
FIG. 6 is another example tool to form the venting channels of FIG. 5 in accordance with the teachings disclosed herein.

FIG. 6 illustrates another example tool 600 that forms the venting channels 500 on the outer resin layer 302 in accordance with the teachings disclosed herein. The example tool 600 of FIG. 6 is similar to the example tool 400 of FIG. 4A. Thus, because the tool 400 is described in detail in connection with FIG. 4A, some characteristics (e.g., materials, dimensions, manufacturing of, etc.) of the tool 600 of FIG. 6 are not described in further detail below.

As illustrated in FIG. 6, protrusions 602 are defined on the outer surface 404 of the tool 400. For example, the protrusions 602 extend along a length 604 of the body 402 of the tool 600 approximately perpendicular to the longitudinal axis 406 of the tool 600. Because the venting channels 500 are formed by the protrusions 602 of the tool 600, the venting channels 500 have substantially similar dimensions and/or cross-sections as the protrusions 602 of the tool 600. For example, the protrusions 602 are spaced apart along the outer surface 404 by a distance 606 that is substantially equal to a distance 608 between the corresponding venting channels 500. Further, because the protrusions 602 extend along the length 606 of the example tool 600, the tool 600 rolls, rotates and/or otherwise moves in the direction 314 along the outer resin layer 302 to form the venting channels 500 that extend in the direction 502. Thus, the venting channels 500 extend in the direction 502 that is approximately perpendicular to the direction 314 in which the tool 600 moves to form the venting channels 500.

The tool 600 of the illustrated example may be utilized to form the venting channels 500 on the panel 304 in a factory environment. For example, the tool 600 forms the venting channels 500 in a manufacturing process before the decorative layer 306 (FIG. 5) is coupled to the panel 304. To enable the venting channels 500 formed by the tool 600 to extend along a width 610 of the outer resin layer 302, the length 604 of the body 402 of the tool 600 is greater than the width 610 of the outer resin layer 302. For example, each of the ends 414 of the tool 600 extend beyond the corresponding outer edges 504 of the outer resin layer 302 to ensure that the venting channels 500 formed by the protrusions 602 of the tool 600 extend to the outer edges 504 of the outer resin layer 302.

Figure 7:
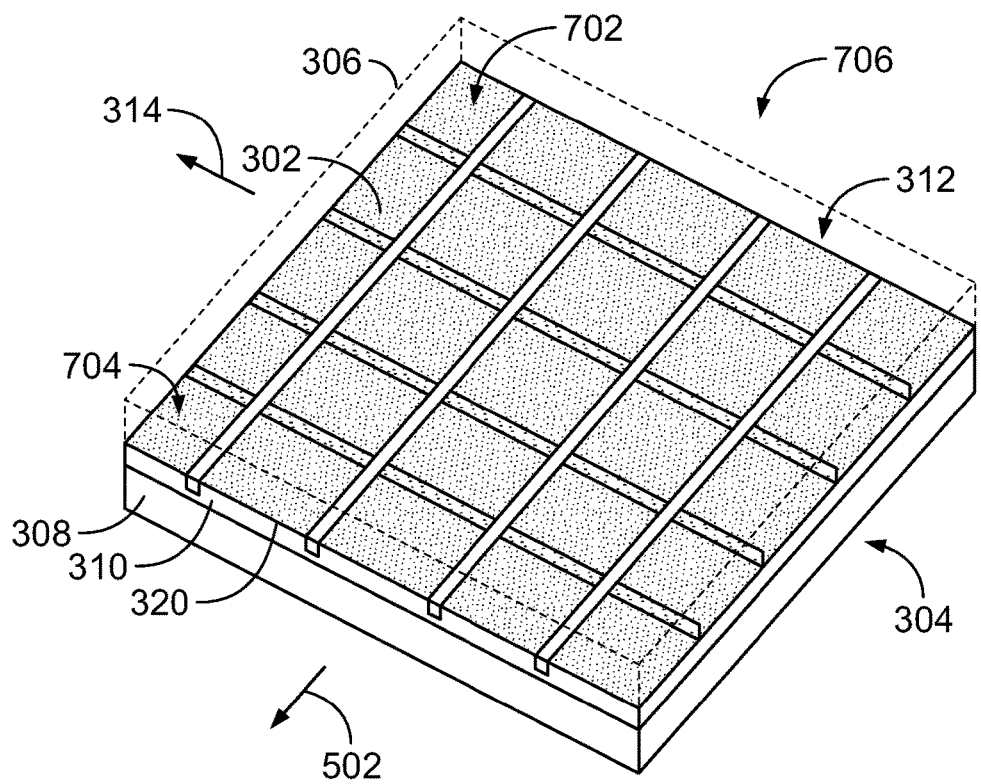
FIG. 7 illustrates other example one or more venting channels formed on the outer resin layer of FIG. 3 in accordance with the teachings disclosed herein.

FIG. 7 illustrates other example one or more venting channels 702 (e.g., first venting channels) and one or more venting channels 704 (e.g., second venting channels) formed on the outer resin layer 302 of the panel 304. When the decorative layer 306 is coupled to the outer resin layer 302 of the panel 304, the venting channels 702, 704 vent gas and/or vapor (e.g., water vapor) that originates from the panel 304 away from the decorative layer 306 to deter and/or impede the gas and/or vapor from causing a portion of the decorative layer 306 from separating from the panel 304 (e.g., the venting channels 702, 704 deter and/or impede the decorative layer 306 from bubbling).

The panel 304 (e.g., the outer resin layer 302, the core layer 308, the reinforcing layer 310, the other reinforcing layer of the sandwich-structured composite opposite the reinforcing layer 310, the coating 312) and the decorative layer 306 (e.g., the adhesive layer 320) of FIG. 7 are substantially similar or identical to those components having the same reference numbers in FIGS. 3 and 5. Further, the venting channels 702, 704 of FIG. 7 are substantially similar or identical to the venting channels 300 of FIGS. 3 and 4 and the venting channels 500 of FIGS. 5 and 6. Because the venting channels 300, 500 are described in detail in connection with FIGS. 3-6, some characteristics of the venting channels 702, 704 of FIG. 7 are not described in further detail below.

As illustrated in FIG. 7, the one or more venting channels 702 intersect the one or more venting channels 704 to form a grid 706. In the illustrated example, the venting channels 702 extend in the direction 314 and the venting channels 704 extend in the direction 502 such that the venting channels 702 are approximately perpendicular to the venting channels 704. In other examples, the venting channels 702, 704 are substantially non-perpendicular relative to each other (e.g., intersect at an angle of about 30 degrees, 45 degrees, 60 degrees) and/or do not intersect. For example, the venting channels 702, 704 may intersect at a substantially non-perpendicular angle to direct the gas and/or vapor toward and/or away from a portion of the resin layer 302. The grid 706 of the intersecting venting channels 702, 704 increases an amount of gas and/or vapor that the venting channels 702, 704 are able to vent away from the decorative layer 306, for example, by increasing a surface area of the venting channels 702, 704 and/or by providing venting paths in a plurality of directions to further deter and/or impede a portion of the decorative layer 306 from separating from the panel 304. Further, the grid 706 increases the amount of gas and/or vapor that the venting channels 702, 704 are able to vent away by providing alternative intersecting paths that enable the gas and/or vapor to traverse through one of the venting channels 702, 704 if another of the venting channels 702, 704 is partially or fully obstructed.

The venting channels 702, 704 are formed, for example, by initially forming the venting channels 702 or the venting channels 704 and subsequently forming the other of the venting channels 702 or the venting channels 704. The tool 400 (FIG. 4A), the tool 450 (FIG. 4B) and/or the tool 600 (FIG. 6) may be utilized to form the venting channels 702, 704. In some examples, the tool 400 moves along the outer resin layer 302 in the direction 314 to form the venting channels 702. The tool 400 is then repositioned (e.g., rotated approximately 30 degrees, 45 degrees, 60 degrees, 90 degrees) on the outer resin layer 302 of the panel 304 and moved along the outer resin layer 302 in the direction 502 to form the venting channels 704 that intersect the venting channels 702. Alternatively, the tool 600 may move along the outer resin layer 302 in the direction 314 to form the venting channels 704, be repositioned (e.g., rotated approximately 30 degrees, 45 degrees, 60 degrees, 90 degrees) on the outer resin layer 302 of the panel 304, and move along the outer resin layer 302 in the direction 502 to form the venting channels 702. In other examples, one of the tools 400, 600 is used to form the venting channels 702 or the venting channels 704, and the other of the tools 400, 600 is used to form the other of the venting channels 702 or the venting channels 704. For example, the tool 400 may move along the outer resin layer 302 in the direction 314 to form the venting channels 702, and the tool 600 may move along the outer resin layer 302 in the direction 314 to form the venting channels 704.

Figure 8:
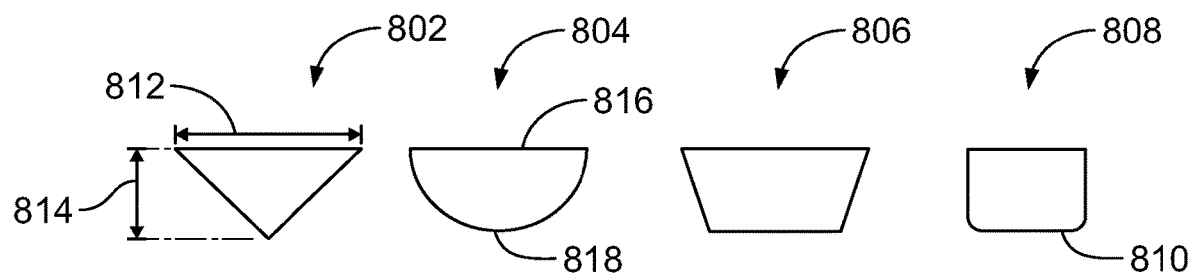
FIG. 8 illustrates example cross-sections of the venting channels formed by the tool of FIG. 3 and/or the tool of FIG. 5.

FIG. 8 illustrates example cross-sections 802, 804, 806, 808 of the one or more venting channels 300 (FIGS. 3 and 4A), the one or more venting channels 500 (FIGS. 5 and 6), the one or more venting channels 702 (FIG. 7) and/or the one or more venting channels 704 (FIG. 7) formed by the tool 400 (FIG. 4A), the tool 450 (FIG. 4B) and/or the tool 600 (FIG. 6). Further, because the venting channels 300, 500, 702, 704 are formed by the protrusions 408 (FIG. 4A) of the tool 400, the protrusions 470 (FIG. 4B) of the tool 450 and/or the protrusions 602 (FIG. 6) of the tool 600, the protrusions 408, 602 have cross-sections substantially similar to the cross-sections 802, 804, 806, 808. As illustrated in FIG. 8, the cross-section 802 is triangular, the cross-section 804 is arcuate (e.g., semicircular), the cross-section 806 is trapezoidal, and the cross-section 808 is substantially rectangular with curved corners 810. Each of the cross-sections 802, 804, 806, 808 has a width 812 and a depth 814. Further, each of the cross-section 802, 804, 806, 808 has an opening 816 that defines the width 812 of the respective cross-section 802, 804, 806, 808 and a nadir 818 that is the least wide portion of the respective cross-section 802, 804, 806, 808. For example, no portion between the opening 816 and the nadir 818 of each of the cross-sections 802, 804, 806, 808 is wider than the respective opening 816. The gradual narrowing from the opening 816 to the nadir 818 of the cross-sections 802, 804, 806, 808 deters and/or impedes the protrusions 408, 602 of the respective tools 400, 600 from becoming enclosed in the venting channels 300, 500, 702, 704 and, thus, enables the protrusions 408, 602 to form the venting channels 300, 500, 702, 704 without damaging the opening 816 as the protrusions 408, 602 rotate away from the panel 304.

Figure 9:
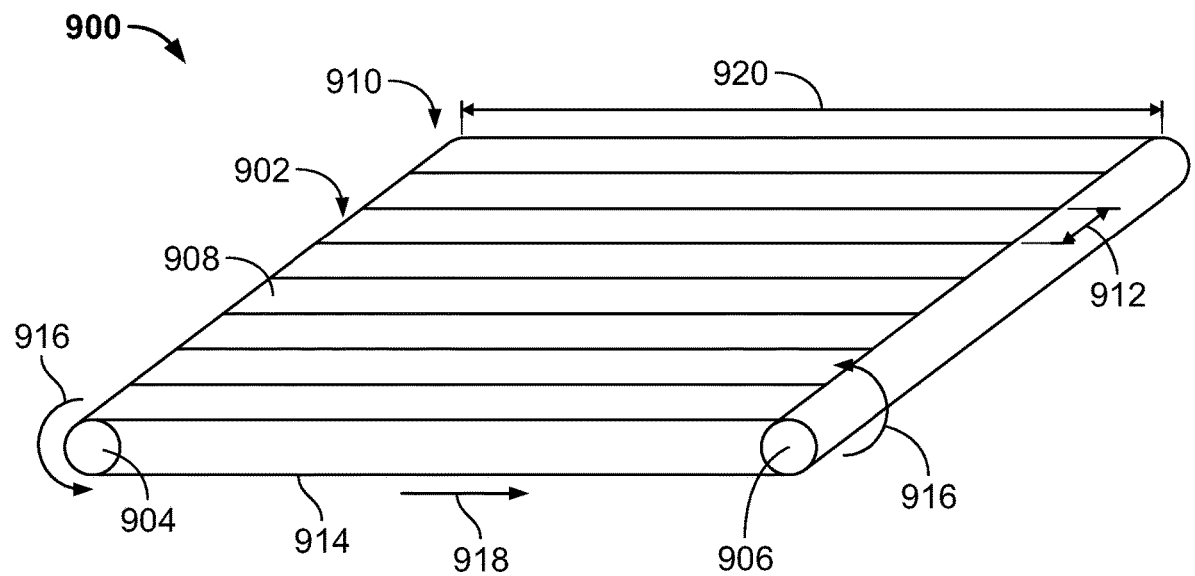
FIG. 9 is another example tool to form one or more venting channels on the outer resin layer of FIG. 3 in accordance with the teachings disclosed herein.

FIG. 9 is another example tool 900 that forms one or more venting channels on the outer resin layer 302 of the panel 304 (FIG. 3) in accordance with the teachings disclosed herein. The tool 900 includes a belt 902 and rollers 904, 906 around which the belt 902 rotates. As illustrated in FIG. 9, an outer surface 908 of the belt 902 defines protrusions 910 that extend longitudinally along the outer surface 908 and form the venting channels on the panel 304. The belt 902 of the tool 900 is composed of a substantially hard material (e.g., steel) to deter and/or impede the protrusions 910 from deforming as the tool 900 forms the venting channels on the outer resin layer 302. The protrusions 910 form the venting channels to have dimensions and/or cross-sections substantially similar to and/or identical to the protrusions 910. For example, the protrusions 910 and, thus, the venting channels formed by the protrusions 910 have a depth and a width of about between 0.01 inches (0.15 millimeters) and 0.039 inches (1 millimeter). Further, the protrusions 910 are spaced apart by a distance 912 to enable the tool 900 to form venting channels that are spaced apart by the distance 912. For example, the protrusions 910 are spaced apart equidistantly by about between 0.125 inches (3.175 millimeters) and 2 inches (50.8 millimeters) to deter and/or impede an adhesive layer (e.g., the adhesive layer 320 of FIGS. 3, 5 and/or 7) from filling the venting channels and/or to deter and/or impede mark-offs from being produced by the venting channels.

In the illustrated example, a portion 914 of the outer surface 908 of the belt 902 contacts and/or engages the outer resin layer 302 to form the venting channels. The belt 902 rotates about the rollers 904, 906 in a rotational direction 916 to cause the portion 914 of the belt 902 to slide along the outer resin layer 302 in a direction 918 as a force and/or pressure is applied to the outer resin layer 302 via the tool 900. The protrusions 910 of the tool 900 imprint and/or otherwise form the venting channels on the outer resin layer 302 as the portion 914 of the belt 902 slides along the outer resin layer 302 of the panel 304. The protrusions 910 extend longitudinally along the belt 902 in the same direction 918 as the belt 902 slides and, thus, form venting channels that extend in the direction 918.

The tool 900 of the illustrated example may be utilized to form venting channels on the panel 304 in a factory environment. For example, the tool 900 forms the venting channels in a manufacturing process before the decorative layer 306 (FIG. 3) is coupled to the panel 304. To enable the venting channels 500 formed by the tool 600 to extend along a length of the outer resin layer 302 of the panel 304, the tool 900 has a length 920 that is greater than a length of the outer resin layer 302 on which the venting channels are to be formed.

Figure 10:
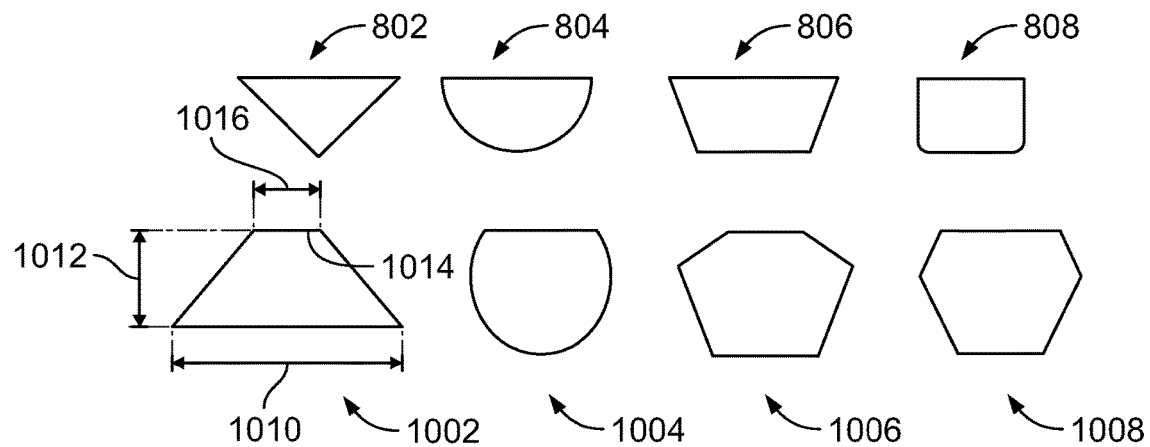
FIG. 10 illustrates example cross-sections of the venting channels formed by the tool of FIG. 9.

FIG. 10 illustrates the example cross-sections 802, 804, 806, 808 and example cross-sections 1002, 1004, 1006, 1008 of one or more venting channels formed by the tool 900 (FIG. 9). Because the venting channels are formed by the protrusions 910 (FIG. 9) of the tool 900, the protrusions 910 have cross-sections substantially similar to the cross-sections 802, 804, 806, 808, 1002, 1004, 1006, 1008.

The example cross-sections 802, 804, 806, 808 of FIG. 10 are substantially similar or identical to those cross-sections having the same reference numbers in FIG. 8. As illustrated in FIG. 10, the cross-section 1002 is trapezoidal (e.g., four-sided trapezoidal), the cross-section 1004 is arcuate, and the cross-section 1006, 1008 are trapezoidal (e.g., six-sided trapezoidal). Each of the cross-sections 1002, 1004, 1006, 1008 has a width 1010 (e.g., a first width) and a depth 1012. The depth 1012 is greater than a thickness of the adhesive layer 320 (FIGS. 3, 5, and 7) to deter and/or impede the adhesive layer 320 from filling the venting channels formed by the protrusions and, thus, prohibiting the venting channels from venting the gas and/or vapor away from the decorative layer 306 (FIGS. 3, 5, and 7). Further, the depth 1012 is small enough to deter and/or impede the venting channels from damaging the fiber reinforcing layer of the reinforcing layer 310 (FIGS. 3, 5, and 7) and/or from being visible when the decorative layer 306 is coupled to the panel 304 (FIGS. 3, 5, and 7). For example, the depth 1012 is about between 0.01 inches (0.15 millimeters) and 0.039 inches (1 millimeter) to deter and/or impede the adhesive layer 320 from filling the venting channels. Further, the width 1010 is, for example, about between 0.01 inches (0.15 millimeters) and 0.039 inches (1 millimeter) to enables the venting channels to sufficiently vent the gas and/or vapor away from the decorative layer 306.

Further, each of the cross-sections 1002, 1004, 1006, 1008 has an opening 1014 that defines a width 1016 (e.g., a second width). As illustrated in FIG. 10, the width 1010 of each of the cross-sections 1002, 1004, 1006, 1008 as a whole is greater than the width 1016 of the opening 1014 of the respective cross-sections 1002, 1004, 1006, 1008. For example, the width 1010 of the venting channels increases an amount of gas and/or vapor that the venting channels are able to vent, and the width 1016 of the openings 1014 of the venting channels reduces an effect on an aesthetic characteristic of the decorative layer (e.g., the decorative layer 306 of FIGS. 3, 5 and/or 7) caused by the venting channels (e.g., the width 1016 of the openings 1014 reduces mark-off produced by the venting channels). The protrusions 906 of the tool 900 are able to form the venting channels to have such cross-sections (e.g., cross-sections in which the opening 1014 is not the widest portion of the venting channel) without damaging the corresponding openings 1014, because the protrusions 906 of the tool 900 separate from the venting channels by sliding off an edge of the outer resin layer 302 (e.g., the protrusions 906 do not separate from the venting channels by moving away from the outer resin layer 302 in a transverse direction).

Figure 11:
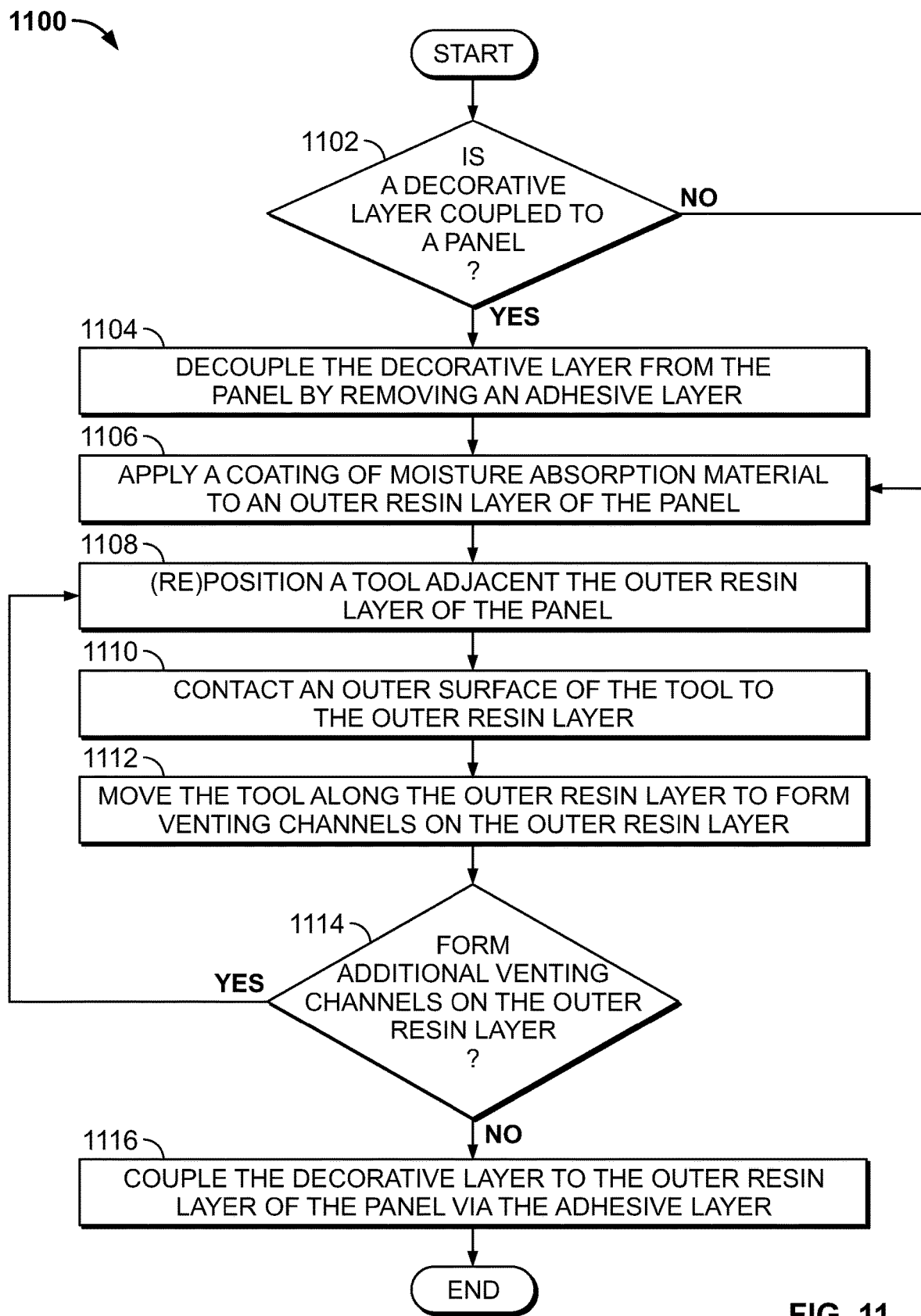
FIG. 11 is a flowchart representative of an example method to form the example venting channels of FIGS. 3, 5 and/or 7 via the example tools of FIGS. 4, 6 and/or 9 in accordance with the teachings herein.

FIG. 11 is a flowchart representative of an example method 1100 to form one or more venting channels on a panel in accordance with the teachings herein. Although the example method 1100 is described with reference to the flowchart illustrated in FIG. 11, many other methods for forming the venting channels on the panel may alternatively be used. For example, the order of execution of the blocks may be changed, and/or some of the blocks described changed, eliminated, and/or combined.

The method 1100 for forming one or more venting channels on a panel is discussed in connection with the panel 304 of FIGS. 3-7, the tool 400 of FIG. 4A, the tool 450 of FIG. 4B, the tool 600 of FIG. 6 and/or the tool 900 of FIG. 9. Further, because the method 1100 may refer to the panel 304 of FIGS. 3-7, the tool 400 of FIG. 4A, the tool 450 of FIG. 4B, the tool 600 of FIG. 6 and/or the tool 900 of FIG. 9, components identified in FIGS. 3-7 and 9 having functions substantially similar or identical to the functions of components described below will not be described in detail again. Instead, the same reference numbers will be used for like structures.

The example method 1100 disclosed herein starts at block 1102 by determining whether a decorative layer (e.g., the decorative layer 306 of FIGS. 3, 5, and 7) is coupled to a panel (e.g., the panel 304 of FIGS. 3-7). If the decorative layer is coupled to the panel, the decorative layer is decoupled from the panel by removing an adhesive layer (e.g., the adhesive layer 320 of FIGS. 3, 5, and 7) from the panel (block 1104).

Upon decoupling the adhesive layer from the panel or upon determining that the adhesive layer is not coupled to the panel, a coating (e.g., the coating 312 of FIGS. 3, 5, and 7) of moisture absorption material is applied to an outer resin layer (e.g., the outer resin layer 302 of FIGS. 3-7) of the panel (block 1106). At block 1108, a tool (e.g., the tool 400 of FIG. 4A, the tool 450 of FIG. 4B, the tool 600 of FIG. 6, the tool 900 of FIG. 9) is positioned adjacent the outer resin layer of the panel. Further, at block 1110, an outer surface (e.g., the outer surface 404 of FIGS. 4 and 6, the outer surface 908 of FIG. 9) of the tool contacts the outer resin layer (block 1108).

At block 1112, the example method 1100 includes moving the tool along the outer resin layer of the panel to form one or more venting channels (e.g., first venting channels, the venting channels 300 of FIGS. 3 and 4, the venting channels 500 of FIGS. 5 and 6, the venting channels 702, 704 of FIG. 7) on the outer resin layer. For example, a pressure is applied to the outer resin layer of the panel via the tool (e.g., by a technician) as the tool is moved along the outer resin layer to form the venting channels. In some examples, the tool 400 rotates and/or rolls in a first direction (e.g., the first direction 314 of FIGS. 3 and 7) to form one or more venting channels (e.g., the venting channels 300 of FIGS. 3 and 4, the venting channels 702 of FIG. 7) to extend in the first direction. Alternatively, the tool 600 may rotate and/or roll in the first direction to form one or more venting channels (e.g., the venting channels 500 of FIGS. 5 and 6, the venting channels 704 of FIG. 7) that extend in a second direction (e.g., the direction 502 of FIGS. 5-7) is approximately perpendicular to the first direction. In other examples, the tool 900 slides along the outer resin layer in the first direction to form one or more venting channels that extend in the first direction.

At block 1114, the example method 1112 includes determining whether to form additional venting channels on the outer resin layer. Blocks 1108, 1110, 1112, 1114 are repeated until no other venting channels are to be formed. For example, second venting channels are formed by repeating blocks 1108, 1110, 1112, 1114. In some examples, the tool is repositioned at block 1108 so that the second venting channels formed at block 1112 are spaced apart from and extend in the same direction as the first venting channels. In other examples, the tool is repositioned at block 1108 by rotating the tool (e.g., approximately 90 degrees) to change an orientation of the tool relative to the outer resin layer so that the second venting channels formed at block 1112 extend in the second direction and intersect (e.g., are approximately perpendicular to) the first venting channels.

Upon determining that no other venting channels are to be formed on the outer resin layer at block 1114, the example method includes coupling the decorative layer to the outer resin layer of the panel via the adhesive layer (block 1116). For example, if the decorative layer was decoupled from the outer resin layer at block 1104, the decorative layer is recoupled to the outer resin layer at block 1116.

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A method comprising:
    contacting an outer surface of a tool, the tool defining a belt to rotate about a first roller and a second roller, to an outer resin layer of a panel, the outer surface of the tool having protrusions;
    moving the outer surface of the tool on the outer resin layer of the panel in the first direction via a first roller and the second roller to cause the protrusions of the tool to form venting channels extending parallel to one another across a length of the outer resin layer of the panel from a first edge of the outer resin layer to a second edge of the outer resin layer, respective ones of the protrusions extending only longitudinally along the outer surface of the tool and only perpendicular to a longitudinal axis of the first roller and a longitudinal axis of the second roller; and
    coupling a decorative layer to the outer resin layer of the panel via an adhesive layer, the venting channels having a depth greater than a thickness of the adhesive layer to impede the adhesive layer from filling the venting channels, the venting channels to vent at least one of gas or vapor away from the decorative layer to deter the at least one of gas or vapor from exerting a pressure on the decorative layer to deter separation of a portion of the decorative layer from the outer resin layer.

2. The method of claim 1, wherein moving the outer surface of the tool on the outer resin layer of the panel includes rotating the tool in the first direction along the outer resin layer.

3. The method of claim 2, wherein rotating the tool in the first direction causes the protrusions to form the first venting channels to extend in the first direction along the outer resin layer.

4. The method of claim 1, wherein moving the outer surface of the tool on the outer resin layer of the panel includes sliding the outer surface of the tool in the first direction along the outer resin layer of the panel to form the first venting channels to extend in the first direction.

5. The method of claim 1, further including applying a coating of moisture absorption material to the outer resin layer of the panel to further deter the at least one of gas or vapor from reaching the decorative layer to deter separation of the portion of the decorative layer from the outer resin layer.

6. The method of claim 1, further including:
    decoupling the decorative layer from the panel by removing the adhesive layer from the outer resin layer;
    repairing any of the venting channels on the outer resin layer via the tool; and
    recoupling the decorative layer to the panel by reapplying the adhesive layer to the outer resin layer.

7. An apparatus comprising:
    a first roller,
    a second roller, and
    a tool defining a belt to rotate about the first roller and the second roller, the tool including:
        an outer surface that is to engage and move along an outer resin layer of a panel; and
        a first protrusion defined on the outer surface and a second protrusion defined on the outer surface, the first protrusion extending longitudinally along the outer surface and only perpendicular to a only longitudinal axis of the first roller and a longitudinal axis of the second roller, the second protrusion extending longitudinally along the outer surface and only perpendicular to the longitudinal axis of the first roller and the only longitudinal axis of the second roller, the first protrusion to form a first venting channel extending across the outer resin layer of the panel from a first edge of the outer resin layer to a second edge of the outer resin layer and the second protrusion to form a second venting channel extending across the outer resin layer from the first edge of the outer resin layer to the second edge of the outer resin layer as the tool moves along the outer resin layer, the second venting channel extending parallel to the first venting channel across a length of the outer resin layer from the first edge of the outer resin layer to the second edge of the outer resin layer, the first venting channel and the second venting channel to vent at least one of gas or vapor away from a decorative layer that is to couple to the panel via an adhesive layer to deter the at least one of gas or vapor from exerting a pressure on the decorative layer to deter separation of a portion of the decorative layer from the outer resin layer, the first protrusion having a first depth that defines a second depth of the first venting channel, the second depth greater than a thickness of the adhesive layer to impede the adhesive layer from filling the venting channels.

8. The apparatus of claim 7, wherein the tool is to rotate about the longitudinal axis of the first roller and the longitudinal axis of the second roller to move on the outer resin layer to form the first venting channel and the second venting channel.

9. The apparatus of claim 7, wherein the tool is to slide via the first roller and the second roller in a first direction on the outer resin layer to form the first venting channel and the second venting channel, the first and second venting channels to extend in the first direction.

10. The apparatus of claim 7, wherein a length of the tool extending between the first roller and the second roller is greater than a length of the outer resin layer.

11. The apparatus of claim 7, wherein the first protrusion has an arcuate or polygonal cross-section and the first venting channel formed by the first protrusion has an arcuate or polygonal cross-section.

12. The apparatus of claim 7, wherein a depth of the first venting channel is less than a depth of the panel.

13. The apparatus of claim 7, wherein first protrusion has a depth between 0.01 inches and 0.039 inches.

14. The apparatus of claim 7, wherein the belt is composed of a material including steel.

15. An apparatus comprising:
a first roller;
a second roller; and
a belt to rotate about the first roller and the second roller, the belt including:
a surface to engage an outer resin layer of a panel; and
first means for forming venting channels in the outer resin layer and second means for forming the venting channels in the outer resin layer, the first means for forming and the second means for forming extending away from the surface, the first means for forming extending only longitudinally along the surface and only perpendicular to a longitudinal axis of the first roller and a longitudinal axis of the second roller, the second means for forming extending only longitudinally along the surface and only perpendicular to the longitudinal axis of the first roller and the longitudinal axis of the second roller, the first means for forming and the second means for forming to form the venting channels extending parallel to one another across a length of the outer resin layer from a first edge of the outer resin layer to a second edge of the outer resin layer as the surface moves along the outer resin layer, the venting channels formed by the first means for forming and the second means for forming to vent at least one of gas or vapor away from a decorative layer of the panel to deter the at least one of gas or vapor from exerting a pressure on the decorative layer to deter separation of a portion of the decorative layer from the outer resin layer, the venting channels having a depth greater than a thickness of an adhesive layer to impede an adhesive layer from filling the venting channels.

16. The apparatus of claim 15, wherein the first means for forming has an arcuate or polygonal cross-section.

17. The apparatus of claim 15, wherein a length of the belt extending between the first roller and the second roller is greater than a length of the outer resin layer.

18. The apparatus of claim 15, wherein the belt is composed of a material including steel.

19. The apparatus of claim 15, wherein the belt is rotate about the longitudinal axis of the first roller and the longitudinal axis of the second roller to move on the outer resin layer to form the venting channels.

20. The apparatus of claim 15, wherein the belt is to slide via the first roller and the second roller in a first direction on the outer resin layer to form the venting channels, the venting channels to extend in the first direction.

* * * * *

UNITED STATES PATENT AND TRADEMARK OFFICE
CERTIFICATE OF CORRECTION

PATENT NO. : 10,647,099 B2  
APPLICATION NO. : 15/153324  
DATED : May 12, 2020  
INVENTOR(S) : Xiaoxi Wang Page 1 of 1

It is certified that error appears in the above-identified patent and that said Letters Patent is hereby corrected as shown below:

In the Claims

Column 17, Line 58, Claim 1:  
After, "in", replace "the" with --a--  
Column 17, Line 58, Claim 1:  
After, "via", replace "a" with --the--  
Column 18, Line 16, Claim 3:  
After, "the" and before "venting" remove --first--  
Column 18, Line 23, Claim 4:  
After, "the" and before "venting" remove --first--  
Column 18, Line 38, Claim 7:  
After, "roller", replace "," with --;--  
Column 18, Line 39, Claim 7:  
After, "roller", replace "," with --;--  
Column 18, Line 46, Claim 7:  
After, "extending" and before "longitudinally" add --only--  
Column 18, Line 47, Claim 7:  
After, "a" and before "longitudinal" remove --only--  
Column 18, Line 50, Claim 7:  
After, "extending" and before "longitudinally" add --only--  
Column 18, Line 52, Claim 7:  
After, "the" and before "longitudinal" remove --only--  
Column 20, Line 23, Claim 15:  
After, "impede", remove "an" and insert --the--

Signed and Sealed this  
Eighth Day of December, 2020

Andrei Iancu  
*Director of the United States Patent and Trademark Office*